(12) United States Patent
Zatta et al.

(10) Patent No.: US 12,190,297 B2
(45) Date of Patent: Jan. 7, 2025

(54) VEHICLE SERVICE CENTER DISPATCH SYSTEM

(71) Applicant: Lyft, Inc., San Francisco, CA (US)

(72) Inventors: Laerte Meneghette Zatta, Tracy, CA (US); Katherine Anne Johnson, San Francisco, CA (US); Luke George Greenwood, San Francisco, CA (US); Daren Allen Pierse, San Francisco, CA (US); Christopher Leigh Buller, San Jose, CA (US); John Gregory Sweigart, Garnet Valley, PA (US); Stephen Calvillo, San Francisco, CA (US); John Christopher Houston, Superior, CO (US); Evan Scott Madow, San Francisco, CA (US); Elad Ossadon, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 641 days.

(21) Appl. No.: 16/727,715

(22) Filed: Dec. 26, 2019

(65) Prior Publication Data

US 2020/0342418 A1    Oct. 29, 2020

Related U.S. Application Data

(60) Provisional application No. 62/840,293, filed on Apr. 29, 2019.

(51) Int. Cl.
*G06Q 10/20* (2023.01)
*B60S 5/00* (2006.01)
(Continued)

(52) U.S. Cl.
CPC .............. *G06Q 10/20* (2013.01); *B60S 5/00* (2013.01); *G06Q 10/063114* (2013.01);
(Continued)

(58) Field of Classification Search
None
See application file for complete search history.

(56) References Cited

U.S. PATENT DOCUMENTS 4,815,190 A    3/1989  Haba, Jr. et al.
6,324,749 B1  12/2001  Katsuura et al.
(Continued)

FOREIGN PATENT DOCUMENTS

DE     102016107091 A1   11/2016
JP         5777373 B2    9/2015
(Continued)

OTHER PUBLICATIONS

Bhadra, Dipasis, David A. Knorr, and Benjamin Levy. "Benefits of virtual queuing at congested airports using ASDE-X: A case study of JFK airport." Air Traffic Control Quarterly 20.3 (2012): 225-251. (Year: 2012).*
(Continued)

*Primary Examiner* — Paul R Fisher
(74) *Attorney, Agent, or Firm* — Keller Preece PLLC

(57) ABSTRACT

The present disclosure relates to systems, non-transitory computer-readable media, and methods for intelligently dispatching vehicles to a vehicle service center to progress vehicles at a predefined rate through sequential stations of the vehicle service center. The disclosed systems can analyze services associated with vehicles. Based on the services, the disclosed systems can determine how to order, within a virtual queue, vehicles corresponding to the services. For example, the disclosed systems can predict a complexity associated with a service for a vehicle, and in turn, determine whether adding the vehicle to the service queue will allow the vehicle to move through a set of sequential stations in accordance with the predefined progression rate. In response, the disclosed systems can dispatch the vehicle, refrain from dispatching the vehicle, or
(Continued)

otherwise dynamically respond to enable the vehicle to move through the set of sequential stations in accordance with the predefined progression rate.

20 Claims, 17 Drawing Sheets

(51) Int. Cl.
    *G06Q 10/0631* (2023.01)
    *G06Q 10/0875* (2023.01)
    *G06Q 50/40* (2024.01)
    *G07C 5/00* (2006.01)
    *G06N 7/01* (2023.01)

(52) U.S. Cl.
    CPC ............... *G06Q 10/063116* (2013.01); *G06Q 10/06314* (2013.01); *G06Q 10/06315* (2013.01); *G06Q 10/06316* (2013.01); *G06Q 10/0875* (2013.01); *G06Q 50/40* (2024.01); *G07C 5/006* (2013.01); *G07C 5/008* (2013.01); *G06N 7/01* (2023.01)

(56) References Cited

U.S. PATENT DOCUMENTS

| | | | |
|---|---|---|---|
| 6,772,027 B2 | 8/2004 | Kurihara | |
| 8,849,685 B2 * | 9/2014 | Oden | G06Q 10/1095 705/7.11 |
| 8,949,028 B1 | 2/2015 | Klampfl et al. | |
| 10,185,921 B1 * | 1/2019 | Heller | G07C 9/38 |
| 10,708,277 B2 | 7/2020 | Thorley et al. | |
| 10,796,248 B2 | 10/2020 | Liu et al. | |
| 10,895,463 B1 | 1/2021 | Cope et al. | |
| 11,402,223 B1 | 8/2022 | Grealish-Rust et al. | |
| 2002/0082814 A1 | 6/2002 | Doner | |
| 2002/0152615 A1 | 10/2002 | Kurihara | |
| 2005/0073434 A1 * | 4/2005 | Arquette | G08G 1/096811 340/907 |
| 2005/0089053 A1 * | 4/2005 | Zhu | H04M 3/5191 370/420 |
| 2005/0257358 A1 | 11/2005 | Giarrizzo | |
| 2007/0050221 A1 * | 3/2007 | Singh | G06Q 10/06314 705/7.24 |
| 2008/0010107 A1 * | 1/2008 | Small | G06Q 50/30 705/1.1 |
| 2008/0133283 A1 * | 6/2008 | Backer | G06Q 10/02 705/5 |
| 2009/0106036 A1 * | 4/2009 | Tamura | G06Q 10/109 705/305 |
| 2011/0060480 A1 | 3/2011 | Mottla et al. | |
| 2011/0314665 A1 | 12/2011 | Kilibarda | |
| 2013/0238167 A1 | 9/2013 | Stanfield et al. | |
| 2013/0318002 A1 * | 11/2013 | Tomiyama | G06Q 10/08355 705/338 |
| 2015/0206206 A1 | 7/2015 | Puente et al. | |
| 2016/0078695 A1 * | 3/2016 | McClintic | G07C 5/0816 701/29.4 |
| 2016/0093216 A1 | 3/2016 | Lee et al. | |
| 2016/0140649 A1 | 5/2016 | Kleve et al. | |
| 2016/0352113 A1 | 12/2016 | Zhao et al. | |
| 2016/0364678 A1 | 12/2016 | Cao | |
| 2017/0153624 A1 | 6/2017 | Cameron | |
| 2018/0253700 A1 | 9/2018 | Coquillette et al. | |
| 2018/0276595 A1 | 9/2018 | Gariepy et al. | |
| 2019/0025856 A1 | 2/2019 | Turato et al. | |
| 2019/0057335 A1 | 2/2019 | Dyer | |
| 2019/0080274 A1 | 3/2019 | Kovach et al. | |
| 2019/0139258 A1 | 5/2019 | Slattery et al. | |
| 2019/0318549 A1 * | 10/2019 | Zeira | G07C 5/006 |
| 2020/0111268 A1 | 4/2020 | Montague et al. | |
| 2020/0132480 A1 | 4/2020 | Majima et al. | |
| 2020/0258018 A1 | 8/2020 | Brady | |
| 2020/0273333 A1 | 8/2020 | Elshenawy et al. | |
| 2020/0342419 A1 | 10/2020 | Zatta et al. | |
| 2020/0342420 A1 | 10/2020 | Zatta et al. | |
| 2020/0356909 A1 | 11/2020 | Tan et al. | |
| 2020/0394623 A1 | 12/2020 | Gardner et al. | |
| 2021/0304153 A1 | 9/2021 | Calvillo et al. | |
| 2022/0333936 A1 | 10/2022 | Schirano | |

FOREIGN PATENT DOCUMENTS

| | | | |
|---|---|---|---|
| KR | 10-2016-0103376 A | 9/2016 | |
| WO | WO2004059446 A2 * | 7/2004 | |
| WO | WO2005124699 A1 * | 12/2005 | ............. G07C 11/00 |
| WO | WO 2012-157343 A1 | 11/2012 | |
| WO | WO2013061289 A1 * | 5/2013 | ............. G06Q 10/02 |
| WO | WO2013177087 A2 * | 11/2013 | ............. G06F 19/20 |
| WO | WO2017205961 A1 * | 12/2017 | |
| WO | WO2018102475 A1 * | 6/2018 | ............. G01C 21/00 |

OTHER PUBLICATIONS

Nam, D., Yang, D., An, S., Yu, JG, Jayakrishnan, R., & Masoud, N. (2018). Designing a Transit-Feeder System using Multiple Sustainable Modes: Peer-to-Peer (P2P) Ridesharing, Bike Sharing, and Walking. Transportation Research Record, 2672(8), 754-763. http://dx.doi.org/10.1177/0361198118799031 (Year: 2018).
U.S. Appl. No. 16/727,773, filed Mar. 13, 2023, Office Action.
U.S. Appl. No. 16/727,746, filed May 24, 2023, Office Action.
U.S. Appl. No. 16/834,977, filed Jun. 5, 2023, Office Action.
International Search Report and Written Opinion as received in PCT/US2020/030297 dated Aug. 12, 2020.
U.S. Appl. No. 16/727,773, filed Sep. 9, 2022, Office Action.
U.S. Appl. No. 16/727,746, filed Nov. 22, 2022, Office Action.
U.S. Appl. No. 16/727,746, filed Dec. 6, 2023, Office Action.
U.S. Appl. No. 16/834,977, filed Nov. 29, 2023, Office Action.
U.S. Appl. No. 16/834,977, filed Mar. 28, 2024, Office Action.
U.S. Appl. No. 17/138,658, filed Apr. 11, 2024, Office Action.
U.S. Appl. No. 16/727,746 filed Jul. 25, 2024, Office Action.
U.S. Appl. No. 16/834,977, filed Oct. 22, 2024, Office Action.

* cited by examiner

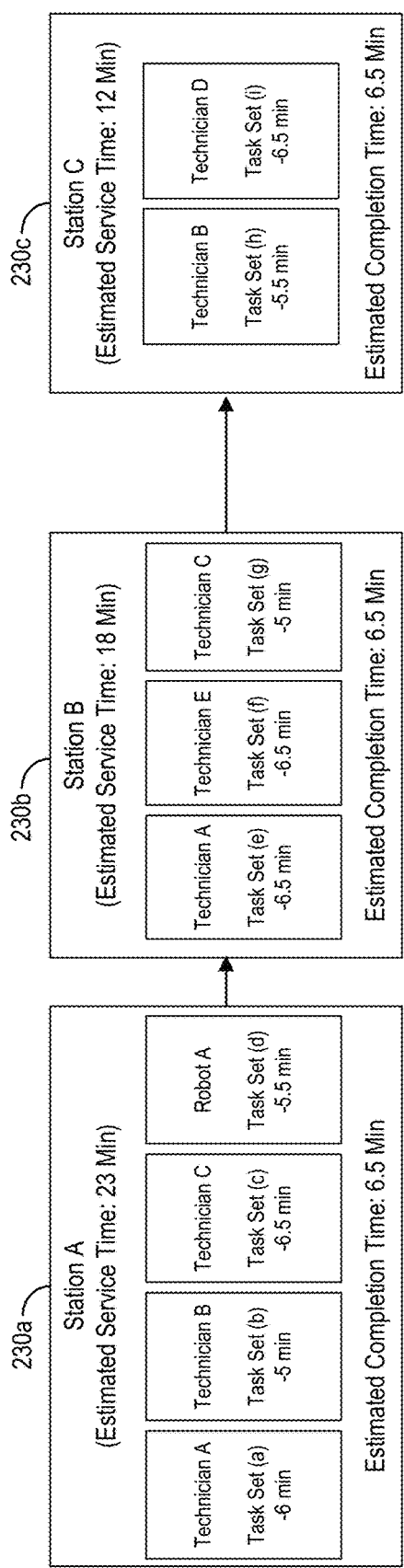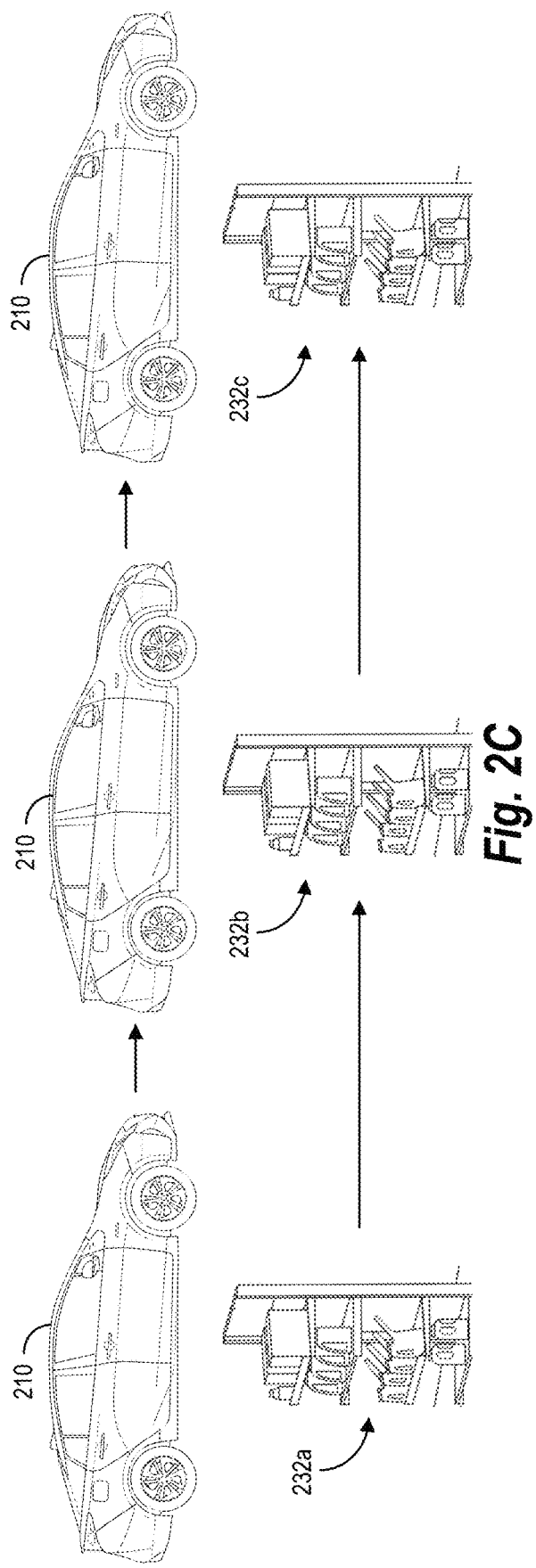
Fig. 2C

Cycle 1

Station A — Vehicle 210
- ID#: F1423
- Services: Oil Change
- Estimated Service Time: 23 min
- Assigned Technicians: A,B,C, Robot A
- Estimated Completion Time: 6.5 min

Station B — Vehicle 212
- ID#: R3351
- Services: 4 new tires, Replace front brakes
- Estimated Service Time: 54 min
- Assigned Technicians: B, D-I
- Estimated Completion Time: 7 min

Station C — Vehicle 208
- ID#: F1002
- Services: Routine Service
- Estimated Service Time: 12 min
- Assigned Technicians: G, J
- Estimated Completion Time: 6.5 min

Cycle 2

Station A — Vehicle 214
- ID#: T1990
- Services: None
- Estimated Service Time: 0 min
- Assigned Technicians: None
- Estimated Completion Time: 0 min

Station B — Vehicle 210
- ID#: F1423
- Services: Tire Rotation
- Estimated Service Time: 18 min
- Assigned Technicians: C, H, I
- Estimated Completion Time: 6 min

Station C — Vehicle 212
- ID#: R3351
- Services: Replace air filter, replace cabin air filter, replace car battery, replace drive belt, routine services
- Estimated Service Time: 39 min
- Assigned Technicians: A,B,D,F,G,I
- Estimated Completion Time: 6.5 min

Cycle 3

Station A — Vehicle 216
- ID#: X2917
- Services: Oil Change
- Estimated Service Time: 25 min
- Assigned Technicians: C,E,F,G
- Estimated Completion Time: 5.5 min

Station B — Vehicle 214
- ID#: T1990
- Services: 2 new tires, replace front brakes, replace broken stud
- Estimated Service Time: 59 min
- Assigned Technicians: A,B,C,D,E,F,G,H,I
- Estimated Completion Time: 6.5 min

Station C — Vehicle 210
- ID#: F1423
- Services: Routine Service
- Estimated Service Time: 12 min
- Assigned Technicians: A,F
- Estimated Completion Time: 6 min

*Fig. 2E*

| ◉ Lyft Drive Center - Bayshore | | | | | | | ≡ ⊛ |
|---|---|---|---|---|---|---|---|
| ‹ September 4, 2019 › | 15<br>Active & Upcoming | 🔍 Driver Lookup | 1<br>Checked In | 3<br>In Progress | 19<br>Completed | 13<br>Canceled | |
| Driver | Reason | Vehicle | Notes | Expected Arrival +<br>Check In | | Progress/Time | |
| 👤 Steve Drake | Maintenance ▶ | 2018 Nissan Sentra<br>12345678910111213 | FD, Odu,<br>68197 | ☑ 10:05 AM | | 15m<br>In Service | ⋮ ≡ |
| 👤 Kelly Black | Maintenance ▶ | 2017 Toyota Tacoma<br>31648523941359413 | PV, Odu,<br>73003 | ☑ 10:12 AM | | 8m<br>In Service | ⋮ ≡ |
| 👤 Frank Paul | Maintentence ▶ | 2012 Hyundai Sonoma<br>SEG8F1FGS42E4R2A | FD, Odu,<br>41600 | ☑ 10:19 AM | | 1m<br>In Service | ⋮ ≡ |
| 👤 David Choi | Maintentence ▶ | 2016 Audi Q7<br>JGU654651685165 | FD, Odu,<br>15009 | ☑ 10:26 AM | | Scheduled | ⋮ ≡ |
| 👤 Bob Wagner | Maintentence ▶ | 2017 Honda Civic<br>1984659SRG1S56RG | FD, Odu,<br>27000 | ☐ 10:33 AM | | Scheduled | ⋮ ≡ |
| 👤 Adi Green | Maintentence ▶ | 2015 Toyota Camry<br>KSHSD16843251351 | PV, Odu,<br>45056 | ☐ 10:40 AM | | Scheduled | ⋮ ≡ |
| 👤 Ben Johnson | Maintentence ▶ | 2014 Volkswagon Golf<br>1865186F65655168 | FD, Odu,<br>50027 | ☐ 10:47 AM | | Scheduled | ⋮ ≡ |
| 👤 Luke Holmes | Maintentence ▶ | 2019 Chevrolet Volt<br>48625FES684FE168F | FD, Odu,<br>5685 | ☐ 10:54 AM | | Scheduled | ⋮ ≡ |

*Fig. 6*

VEHICLE SERVICE CENTER DISPATCH SYSTEM

CROSS-REFERENCE TO RELATED APPLICATIONS

This application claims the benefit of and priority to U.S. Provisional Application No. 62/840,293, filed Apr. 29, 2019. This application also relates to the subject matter disclosed in U.S. application Ser. No. 16/727,746, entitled INTELLIGENT MANAGEMENT OF ONE OR MORE MACHINES OF A VEHICLE SERVICE CENTER, and U.S. application Ser. No. 16/727,773, entitled INTELLIGENT MANAGEMENT OF ONE OR MORE DISPLAY DEVICES OF A VEHICLE SERVICE CENTER, each filed on the same day as the present application. The entire contents of the foregoing patent applications are incorporated herein by reference.

BACKGROUND

In recent years, popularity and usage of on-demand transportation matching systems have significantly grown. Indeed, the proliferation of web and mobile applications easily enable requesting individuals to request transportation from on-demand transportation providers. These on-demand transportation matching systems facilitate the completion of thousands and thousands of transportation requests each day. The provided transportation is dependent on the vehicles operated by transportation providers. The vehicles, in turn, require regular servicing in order to ensure that the vehicles can operate in a safe and efficient manner, and without causing unnecessary wear and tear. However, the conventional vehicle service centers that vehicle owners have traditionally used suffer from a number of inefficiencies and other disadvantages. Furthermore, conventional vehicle service centers are incompatible with the dynamic nature of on-demand transportation matching systems.

SUMMARY

This disclosure describes one or more embodiments of methods, non-transitory computer readable media, and systems that solve problems associated with conventional service centers. As will be described in more detail below, the disclosed systems can analyze services for vehicles associated with a dynamic transportation matching system. Based on the services, the disclosed systems can intelligently determine how to order, within a virtual service queue, vehicles corresponding to the services to ensure that vehicles are serviced at the disclosed vehicle service center efficiently and without the delays typical to traditional vehicle service centers. In particular, the disclosed vehicle service center includes sequential stations, through which vehicles progress, stopping at each station, where tasks are performed in accordance with the services for the vehicles.

In more detail, the disclosed systems can determine a complexity associated with a service to be performed for a vehicle. Based on the complexity, the systems can determine if adding the vehicle to the virtual service queue will allow a corresponding vehicle service center to maintain a desired flow of vehicles through sequential stations of the vehicle service center. Specifically, the disclosed systems can determine whether adding the vehicle to the service queue will allow the vehicle and one or more other vehicles in the queue to move through the set of sequential stations in accordance with a predefined progression rate. If so, the disclosed systems can add the vehicle to the virtual service queue and dispatch the vehicle to the vehicle service center in accordance with the vehicle's position within the queue. If not, the disclosed systems can refrain from adding the vehicle to the virtual service queue or dispatching the vehicle to the vehicle service center.

Additional features and advantages are set forth in the description which follows.

BRIEF DESCRIPTION OF THE DRAWINGS

FIG. 2C illustrates task allocations in accordance with one or more embodiments.

FIG. 2E illustrates task allocations for multiple vehicles during multiple time-cycles in accordance with one or more embodiments.

FIG. 6 illustrates a management user interface on a client device for managing a virtual queue for a vehicle service center in accordance with one or more embodiments.

DETAILED DESCRIPTION

Figure 1:
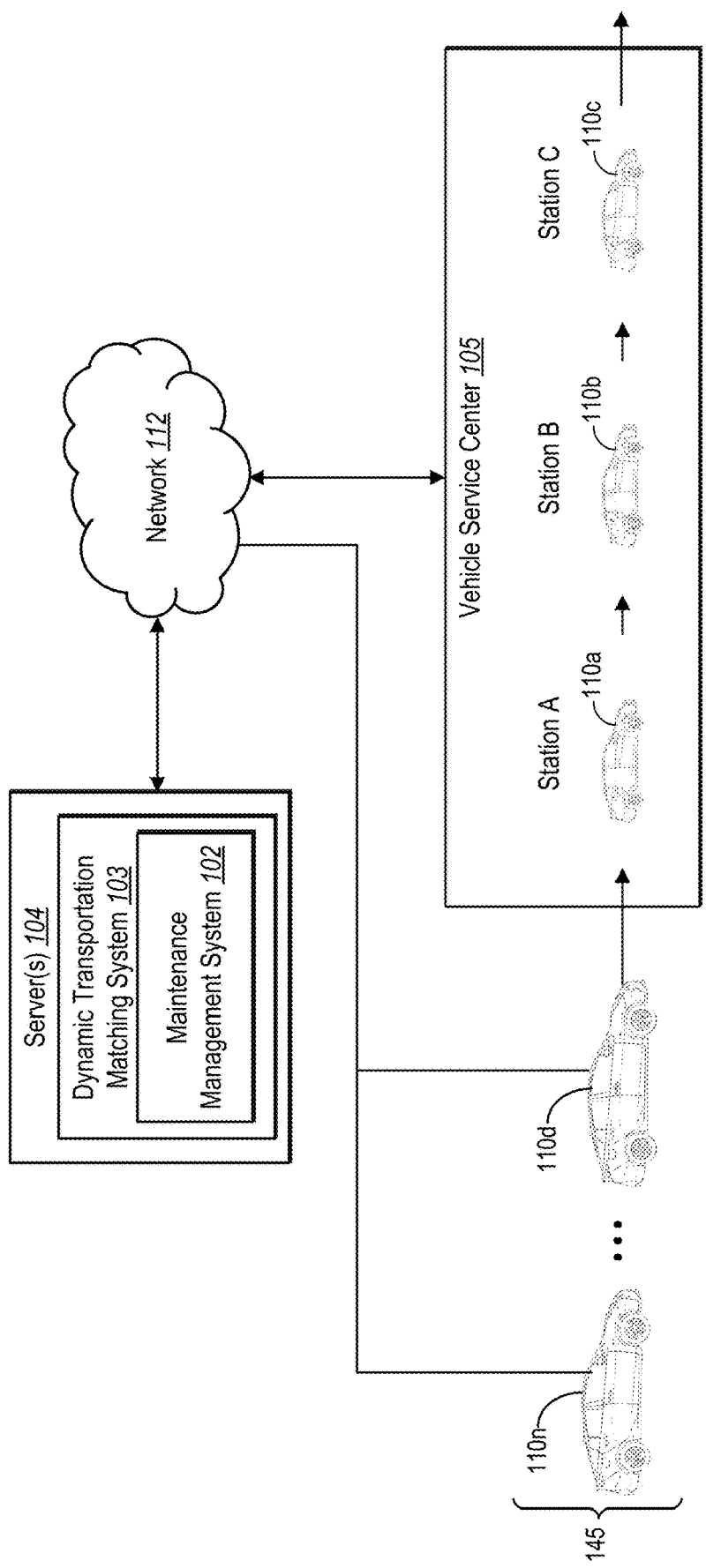
FIG. 1 illustrates a block diagram of an environment for implementing a vehicle service system in accordance with one or more embodiments.

This disclosure describes a vehicle service system and corresponding dynamic transportation matching system that can dynamically identify services for vehicles associated with the dynamic transportation matching system, selectively add the vehicles to virtual service queues, and automatically dispatch the vehicles to vehicle service centers in accordance with their positions in the virtual service queues. In particular, the vehicle service system can intelligently dispatch vehicles to the vehicle service center so as to facilitate progression of the vehicles through the vehicle service center in accordance with a predefined progression rate. In some embodiments disclosed herein, a vehicle service center includes a set of sequential stations through which vehicles progress, stopping at each station. Further, the stations are arranged in a line, end to end. A vehicle to be serviced enters the vehicle service center into a first station, and then moves station to station receiving services at applicable stations until it leaves the last station in the sequence. In some embodiments, the vehicle service center includes three stations. However, the vehicle service center can include any number of stations arranged in a sequence. Each of the stations can be equipped with various tools, parts, and equipment for performing service tasks. The stations can be equipped differently, so that different services can be performed at each station, or the stations can be equipped to each perform any available service. Additional details regarding the vehicle service center and its stations are provided below.

To facilitate a progression of vehicles through the vehicle service center in accordance with a predefined progression rate, in some embodiments, the vehicle service system analyzes information associated with vehicles to be serviced at a vehicle service center. Based on the analyzed information associated with a vehicle, the vehicle service system can determine a complexity of the service for the vehicle. In turn, the vehicle service system can determine whether to add the vehicle to the service queue, and if so, in which position of the service queue. The vehicle service system can then intelligently dispatch the vehicle to the vehicle service center in accordance with the determined position.

As used herein, the term "progression rate" refers to a rate at which vehicles progress through the stations of a vehicle service center. In other words, the progression rate represents how much time vehicles spend at a station before progression on to the next station (or out of the vehicle service center if a vehicle is in the last station). In some embodiments, the progression rate is an average progression rate for a vehicle across multiple stations and/or multiple vehicles across one or more stations. In other embodiments, a progression rate can represent a rate for a single vehicle at a single station or for a single stage of progression by multiple vehicles across multiple stations. The vehicle service system can monitor the completion of services at each station of the vehicle service center to determine the progression rate of one or more vehicles or for the vehicle service center in general. Furthermore, the vehicle service system can determine multiple progression rates corresponding to discrete periods of time (e.g., each hour, each day, each week, or each month).

As used herein, the term "predefined progression rate" refers to a target or maximum progression rate that has been set for a vehicle service center. For example, the predefined progression rate can define a per-station maximum amount of time to perform services on one or more vehicles. The predefined progression rate can apply to every station and every vehicle, or can be an average across multiple stations and multiple vehicles. In some embodiments, the predefined progression rate is the same for each station so that the vehicles progress consistently from station to station without being delayed by vehicles in the other stations. Example predefined progression rates include 5 minutes per station, 6 minutes per station, 7 minutes per station, 8 minutes per station, 9 minutes per station, and 10 minutes per station, although the predefined progression rate can be any progression rate. In some embodiments, the predefined progression rate is set by an administrator, such as a vehicle service center manager. In other embodiments, the vehicle service system can automatically set the predefined progression rate based on the services to be performed, the capabilities of the vehicle service center, and/or other circumstances associated with the vehicle service center. In additional embodiments, the predefined progression rate can be variable and/or dynamically set by the vehicle service system from time to time.

As mentioned above, conventional systems fall short in variety of ways. For example, conventional vehicle service management relies on human judgment for determining if and when to service a vehicle. To help persons responsible for the decision-making process, some systems might provide vehicle service reminders that may include emails, text messages, phone calls, or in-vehicle stickers on windshields. However, such systems are based on a single factor. That is, conventional systems merely remind that a vehicle should be serviced when an event occurs, such as an odometer reading a certain mileage or a non-maintenance period extending for a certain amount of time. In this manner, conventional systems have little control over the service process and fail to consider factors external to mechanical operation of a vehicle.

As an additional result, conventional systems create unpredictable environments at vehicle service centers. For example, using a first-come-first-served basis, conventional systems create widely varying wait times or vehicle service durations. Some users may opt to set an appointment, but conventional systems still approach setting appointments by randomly filling time slots (e.g., according to user selection) and fail to adapt to changing circumstances. The foregoing problems are exacerbated when it comes to coordinating the service of hundreds of thousands of vehicles, as may be associated with a transportation matching system.

This disclosure describes one or more embodiments of a vehicle service system that identifies vehicle service needs, automatically dispatches vehicles to vehicle service centers, and dynamically adapts to changing transportation conditions and changing conditions at vehicle service centers. In some embodiments, the vehicle service system monitors changing conditions and manages a virtual service queue to ensure that vehicles dispatched to a vehicle service center will proceed through stations of the vehicle service center in accordance with a predefined progression rate (e.g., a maximum amount of time that a vehicle can spend at a given station before moving to a subsequent station). For example, in determining whether to dispatch a vehicle to the vehicle service center, the vehicle service system can determine a complexity of a service for the vehicle in addition to complexities of services for other vehicles already in the virtual service queue. In this manner, and based on the capabilities of the vehicle service center, the vehicle service system can assess whether adding the vehicle to the service queue will allow the vehicle and other vehicles to progress through the stations of the vehicle service center according to the predefined progression rate. In addition, at each of the different stations of the vehicle service center, the vehicle service system can dynamically allocate resources (e.g., technicians, robots, machinery, parts, etc.) for servicing the vehicle such that all vehicles can proceed through the different stations according to the predefined progression rate.

Further, the vehicle service system can dynamically respond to various events that might otherwise negatively affect vehicle services and/or optimal provisioning of transportation services. Such events may include events within the vehicle service center, for example, an event causing service delay at a certain station. Other examples of events may be external to the vehicle service center, for example, high transportation request demand. In this manner, the vehicle service system considers numerous factors (e.g., events) relevant to the dynamic transportation matching system to determine when to dispatch vehicles to a vehicle service center. In so doing, the vehicle service system can create a predictable wait time in the vehicle service center and/or a more optimal, reduced amount of unavailability for the vehicle to provide transportation services. In turn, the vehicle service system can reduce transportation request backlog, cancellations, and/or multiple requests for a single transport in the dynamic transportation matching system. Additionally or alternatively, the vehicle service system can reduce an amount of user interactions with user interfaces to manually reallocate resources in the vehicle service center, manually modify the dispatch of vehicles to the vehicle service center, and/or to schedule a vehicle for service. In other words, the embodiments disclosed herein reduce required computing resources, improve the efficiency of a dynamic transportation matching system as it relates to managing service of the vehicles providing transportation services. It also improves the efficiency of user interactions as it relates to scheduling and managing visits to vehicle service centers.

Additional features and advantages of one or more embodiments of the present disclosure are outlined in the description which follows, and in part will be obvious from the description, or may be learned by the practice of such example embodiments.

Turning to the figures, FIG. 1 illustrates an example environment, in which a vehicle service system 102 is integrated into a dynamic transportation matching system 103 and assists in dynamically dispatching vehicles 110a-110n (collectively, "vehicles 110") to a vehicle service center 105 in accordance with one or more embodiments of the present disclosure. In particular, the vehicle service system 102 can (e.g., in conjunction with the dynamic transportation matching system 103) intelligently dispatch the vehicles 110 to the vehicle service center 105 to facilitate servicing the vehicles 110 in accordance with a predefined progression rate through Stations A, B, and C of the vehicle service center 105. The predefined progression rate can include a finite period of time (e.g., about three minutes, about five minutes, about seven minutes, about ten minutes, about fifteen minutes, etc.) allotted for the completion of tasks at each station before a vehicle progresses to a subsequent station. For example, the vehicle service system 102 may adopt a predefined progression rate of seven minutes per station, and utilize the seven-minute progression rate to manage the order of the vehicles 110 within a virtual queue 145, as well as their corresponding dispatch to the vehicle service center 105. To illustrate, the vehicle service system 102 can intelligently organize the vehicles 110 within the virtual queue 145 based on the complexity of each vehicle's service (e.g., alternating between more complex and less complex services) and based the capabilities/resources of the vehicle service center 105 in order to ensure that all of the vehicles 110 can progress through the sequential Stations A, B, and C of the vehicle service center at a progression rate that is equal to or faster than the predefined seven-minute progression rate.

In addition, the vehicle service system 102 can manage and/or determine the allocation of tasks and resources within the vehicle service center 105 and among the Stations A, B, and C. For example, in some embodiments, the vehicle service system 102 can allocate resources and tasks across the Stations A, B, and C in such a way that the vehicles 110 can progress through the Stations A, B, and C in accordance with the predefined progression rate and in accordance with each vehicle's specific services. The allocation of resources can include the allocation of technicians, robots, equipment, and/or other machinery to perform the allocated tasks necessary for each vehicle's service. The allocation of resources and tasks can be further based on the capabilities of each station as well as the available tools, equipment, and/or parts within each station.

As shown, in one or more embodiments, the vehicle service system 102 can be a component of the dynamic transportation matching system 103 implemented on one or more server(s) 104. In these or other embodiments, the vehicle service system 102 may perform one or more acts of the present disclosure in conjunction with or by way of the dynamic transportation matching system 103. Additionally or alternatively, the dynamic transportation matching system 103 may perform one or more acts of the present disclosure in conjunction with or by way of the vehicle service system 102. As further shown in FIG. 1, the vehicle service center 105 and vehicles 110 (and/or provider devices respectively associated therewith) can communicate with the dynamic transportation matching system 103 and/or the vehicle service system 102 via a network 112.

The network 112 shown in FIG. 1 may include one or more networks and may use one or more communication platforms or technologies suitable for transmitting data and/or communication signals. In some embodiments, the network 112 includes a cellular network. The network 112 can additionally include the Internet or World Wide Web. Additionally or alternatively, the network 112 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

In one or more embodiments, the dynamic transportation matching system 103 receives transportation requests from requestor computing devices associated with requesting users and matches the transportation requests to available transportation providers—such as the transportation providers associated with vehicles 110—and communicates with corresponding transportation provider computing devices to facilitate the transport of the requesting users in accordance with the matched transportation requests. For example, each of the vehicles 110 can be associated with a transportation provider with a transportation provider device running a mobile application associated with the dynamic transportation matching system 103, and through which the dynamic transportation matching system 103 dispatches the vehicles 110 to fulfill received transportation requests. In similar manner, the dynamic transportation matching system 103 can dispatch the vehicles 110 to the vehicle service center 105 for service. In alternative embodiments, one or more of the vehicles 110 may be an autonomous vehicle, with which the dynamic transportation matching system 103 communicates to dispatch for fulfillment of transportation requests and completion of services.

Additionally, and as mentioned above, the dynamic transportation matching system 103 includes the vehicle service system 102. In one or more embodiments, the vehicle service system 102 determines that vehicles 110 each have one or more services. For example, the vehicle service system 102 can determine a need for service based on vehicle data, such as user input, vehicle mileage, time elapsed since a previous service, vehicle performance, vehicle type, and/or manufacturer-provided service schedules. In addition, the vehicle service system 102 can monitor the status (e.g., a dispatch status, a ride status, an online status, or a position in a queue at an airport terminal) of each vehicle to determine when a vehicle can be dispatched to a vehicle service center. For instance, the vehicle service system 102 may determine that a vehicle has a fifty-minute wait in a virtual queue at the airport terminal, which may allow sufficient time for service of the vehicle and still maintain position within the virtual queue. In another example, the vehicle service system 102 may determine that a vehicle has a scheduled a drop-off near the vehicle service center 105. In yet another example, the vehicle service system 102 may determine complexities associated with performing the respective service services required for the vehicles 110 and, in turn, add/remove vehicles to the virtual queue 145 and dispatch accordingly so as to allow each of the vehicles to proceed through the Stations A, B, and C in accordance with a predefined progression rate.

Further, in some embodiments, to determine when to dispatch vehicles 110 to the vehicle service center 105, the vehicle service system 102 may obtain information from the vehicle service center 105. Additionally or alternatively, the vehicle service system 102 may obtain metrics associated with the dynamic transportation matching system 103, such as metrics indicating transportation demand, transportation supply, ETAs, and/or any other metrics associated with transportation requestors and transportation providers that use the dynamic transportation matching system 103. Thus, in some embodiments, the vehicle service system 102 coordinates with the vehicles 110 and the vehicle service center 105 to perform services for the vehicles 110 based on information associated with the vehicles 110, information associated with the vehicle service center 105, and/or current transportation metrics. Moreover, the vehicle service system 102 can dynamically respond to changes in real-time or near real-time. For example, the vehicle service system 102 can dynamically and automatically adapt to changing conditions at the vehicle service center 105 (e.g., indicating that the vehicle service center 105 can no longer service a vehicle in accordance with a current position in the virtual queue 145 and/or a predetermined progression rate), a changing status or location of a vehicle (e.g., indicating that the vehicle is no longer available to be dispatched to the vehicle service center 105), or changing conditions associated with the dynamic transportation matching system 103 (e.g., indicating that it is necessary or better for a vehicle to continue servicing transportation requests). Such a dynamic response can improve availability of vehicles for providing transportation to transportation requestors and/or to reduce a potential impact to services for one or more vehicles at the vehicle service center 105.

Furthermore, although not depicted in FIG. 1, a vehicle service center client device may be associated with the vehicle service center 105 for communication with the vehicle service system 102 and for on-site management of vehicle services at the vehicle service center 105. For example, the vehicle service center 105 can include one or more devices, including a computing device (e.g., an admin device associated with a location manager), smart displays at the Stations A, B, and C, various types of technician devices, etc. that are communicatively coupled to each other and/or a network, such as the network 112. In this manner, the vehicle service center 105 can facilitate communication between personnel, machinery, robots, etc. at the vehicle service center 105 and the vehicle service system 102.

Figure 2A:
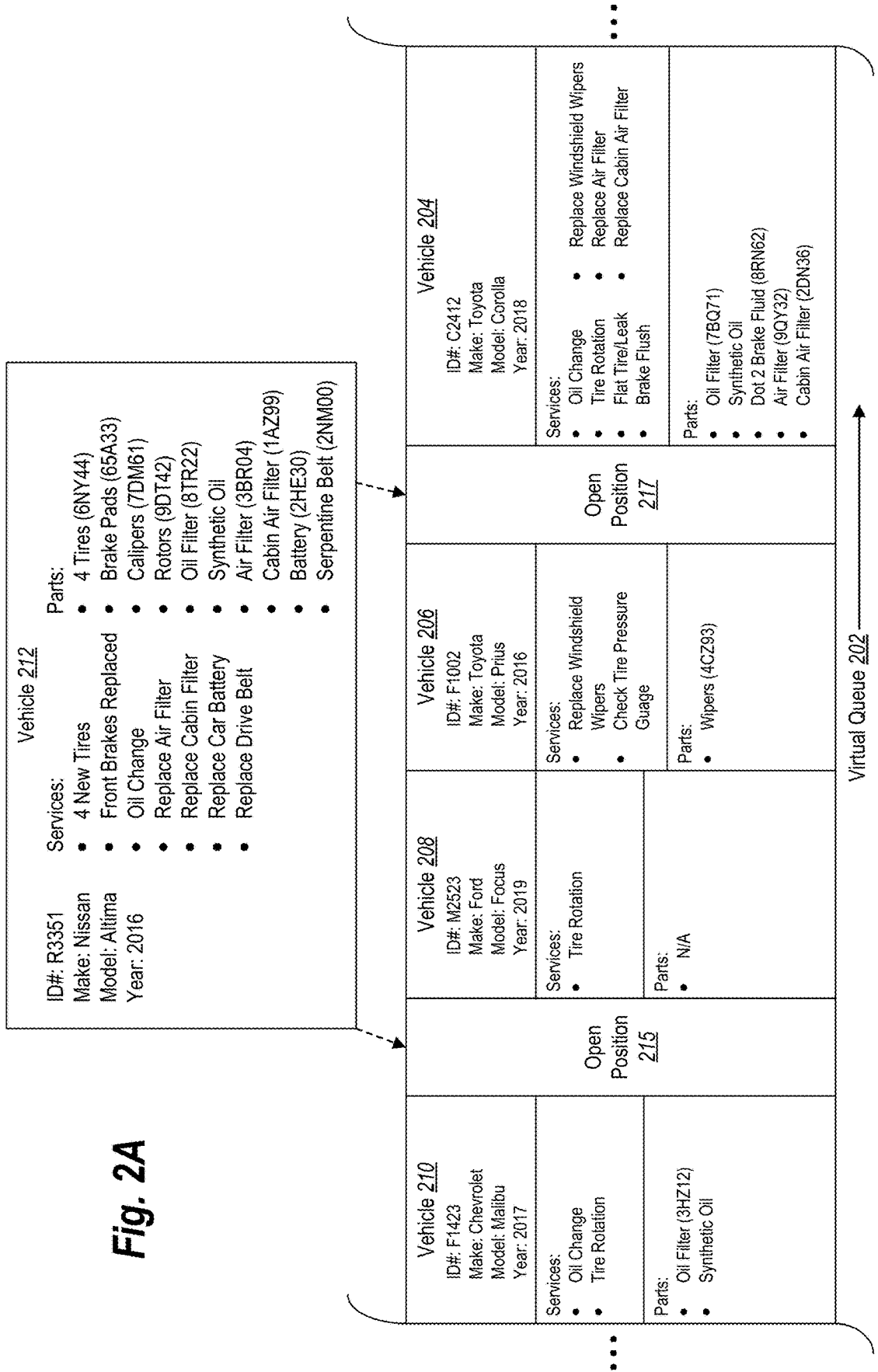
FIG. 2A illustrates a virtual queue that a vehicle service system dynamically manages in accordance with one or more embodiments.

As mentioned above, the vehicle service system 102 can generate and/or manage a virtual queue for one or more vehicles scheduled for service at the vehicle service center 105. FIG. 2A schematically illustrates a virtual queue 202 that the vehicle service system 102 dynamically manages in accordance with one or more embodiments of the present disclosure. As shown, FIG. 2A depicts a portion of the virtual queue 202 including service positions filled by vehicles 204-210 (or representations of the vehicles 204-210, including information respectively associated with the vehicles 204-210) and open positions 215-217. Further, FIG. 2A illustrates an example scenario in which the vehicle service system 102 determines whether to add another vehicle, in this case vehicle 212 to the virtual queue 202 at one of the open positions 215-217.

To determine whether to add the vehicle 212 to the virtual queue 202, the vehicle service system 102 may analyze the information associated with the vehicle 212 and/or one or more vehicles adjacent to an open position. For example, in determining whether to add the vehicle 212 to the virtual queue 202 at the open position 215, the vehicle service system 102 may analyze, in addition to the vehicle 212, (i) the vehicle 210 and the vehicle 208, (ii) the vehicle 210, the vehicle 208, and the vehicle 206, (iii) a vehicle not shown that is subsequent to the vehicle 210, the vehicle 210, and the vehicle 208, and so forth in various combinations. Similarly, with respect to the open position 217, the vehicle service system 102 may analyze, in addition to the vehicle 212, (i) the vehicle 204 and the vehicle 206, (ii) the vehicle 204, the vehicle 206, and the vehicle 208, (iii) a vehicle not shown preceding the vehicle 204, the vehicle 204, and the vehicle 206, and so forth in various combinations.

In more detail, the vehicle service system 102 may analyze information associated with the services to be performed on the foregoing vehicles to determine whether to add the vehicle 212 to the virtual queue 202. Based on the information associated with the services for the vehicles, the vehicle service system 102 can determine a corresponding complexity for performing vehicle services. In turn, the vehicle service system 102 can utilize the determined complexities of the services to assess whether the vehicles in the virtual queue 202 will progress through a set of sequential stations of a vehicle service center in accordance with a predefined progression rate. As used herein, the term complexity can relate to a difficulty level, a skill level, a number of tasks, and/or an amount of time required to satisfy a service. For instance, a service of greater complexity may be more difficult, involve more specialized skills, include more tasks, and/or require more time to complete. On the other hand, a service of less complexity may be less difficult, involve less specialized skills, include less tasks, and/or require less time to complete than a service of greater complexity.

As an example, the vehicle service system 102 may determine that the service for the vehicle 204 has a greater complexity than the service for the vehicle 206 based on the number of tasks or services respectively associated with the vehicles 204 and 206. The determination may be further based on an assessment that replacing windshield wiper blades and checking tire air pressure for the vehicle 206 involve less time and less skill in comparison to performing an oil change, a tire rotation, a flat repair, a brake flush, and replacing windshield wipers, the engine air filter, and the cabin air filter for the vehicle 204.

To assess whether adding the vehicle 212 to the open position 215 or the open position 217 will allow each of the vehicles 204-212 to progress through the set of sequential stations of the vehicle service center in accordance with the predefined progression rate, in some embodiments, the vehicle service system 102 determines a predicted progression rate if the vehicle 212 is added to one of the open positions 215-217 through the set of sequential stations based on complexities of services described above. In turn, the vehicle service system 102 can compare the predicted progression rate with the predefined progression rate. If the predicted progression rate is less than or equal to the predefined progression rate, the vehicle service system 102 may elect to add the vehicle 212 to the given open position within the virtual queue 202. Further, if the predicted progression rate is greater than the predefined progression rate, the vehicle service system 102 may elect to refrain from adding the vehicle 212 to the virtual queue 202.

Applied to the particular decision to add the vehicle 212 to the virtual queue 202 at the open position 217, the vehicle service system 102 may determine that both the services for the vehicle 204 and the vehicle 212 have high complexities. Thus, when analyzed in the back-to-back positioning (i.e., the vehicle 204 of high complexity followed immediately by the vehicle 212 also of high complexity), the vehicle service system 102 may determine that adding the vehicle 212 to the open position 217 will prevent the vehicle service center from performing the required services for the vehicle 212, vehicle 204, and/or other vehicles in accordance with the predetermined progression rate. In some embodiments, the vehicle service system 102 may generate various task and resource allocations for a given potential addition of the vehicle 212 to the open position 217, and then determine a corresponding amount of time required to complete the services in accordance with the different task and resource allocations. Using this information, the vehicle service system 102 not only is able to optimize task and resource allocation within the vehicle service center, but is also able to determine a predicted progression of vehicles in the virtual queue 202 through the vehicle service center. If the potential addition of the vehicle 212 to the open position 217 results in a predicted progression rate that exceeds a desired/predetermined progression rate, the vehicle service system 102 can refrain from adding the vehicle 212 to the open position 217. In contrast for the decision to add the vehicle 212 to the virtual queue 202 at the open position 215, the vehicle service system 102 may determine that vehicles 208, 210 (and/or additional adjacently-positioned vehicles) have services of a low complexity. Thus, when analyzing the potential addition of vehicle 212 to open position 215 (resulting in a vehicle of high complexity sandwiched between vehicles of low complexity), the vehicle service system 102 may determine that adding the vehicle 212 to the open position 215 will still allow the vehicle 212 and adjacently-positioned vehicles to progress through the stations of the vehicle service center in accordance with predefined progression rate. As a result, the vehicle service system 102 may refrain from adding the vehicle 212 to the open position 217 and instead add the vehicle 212 to the open position 215.

Other variations of the foregoing are herein contemplated. For example, the vehicle service system 102 may generate the virtual queue 202 and fill open positions therein such that two, three, or more vehicles with services of less complexity precede and/or succeed a vehicle with services of greater complexity. Additionally or alternatively, a vehicle at a given station may not require any service at that given station, but is nonetheless positioned there until advancing to the next station in accordance with the predefined progression rate. Moreover, the vehicle service system 102 can classify the complexity of different services in a number of ways. For example, the vehicle service system 102 might assign services to complexity classifications (e.g., low complexity, medium complexity, and high complexity), can assign a complexity score (e.g., on a scale of 1-10), or can represent complexity by a time required for the service. Additionally or alternatively, the vehicle service system 102 can account for vehicle service center resources and task allocations (as briefly mentioned above and as described more in relation to FIGS. 2C-2E) to determine whether to add a vehicle to the virtual queue 202.

Figure 2B:
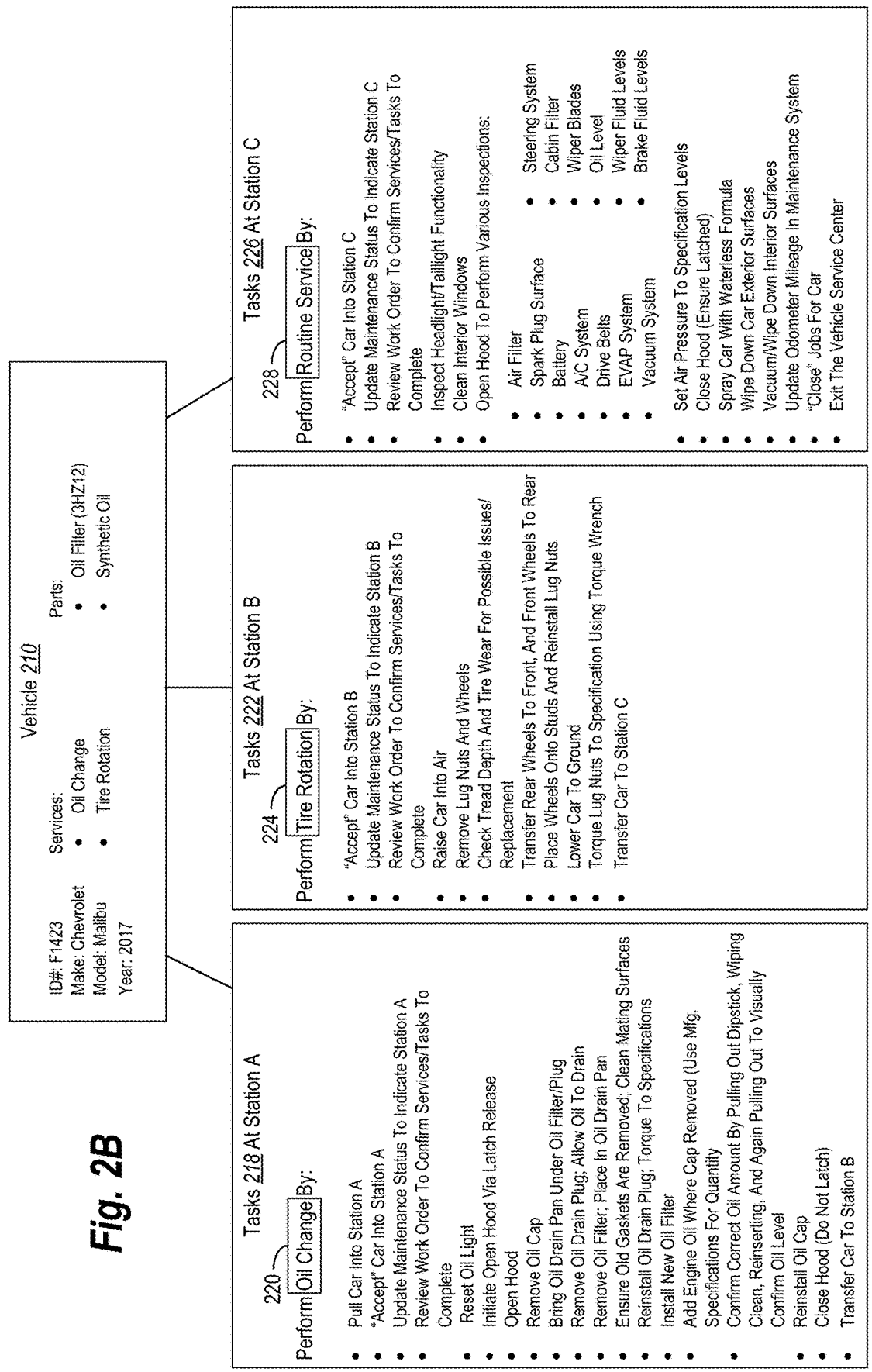
FIG. 2B illustrates a listing of tasks specific to services for a vehicle in accordance with one or more embodiments.

As mentioned above, the vehicle service system 102 may determine a complexity of a service by assessing the tasks necessary to complete the services. FIG. 2B illustrates an example listing and allocation of tasks for the vehicle 210 in accordance with one or more embodiments of the present disclosure. As shown, tasks 218 correspond to a service 220 comprising an oil change, tasks 222 correspond to a service 224 comprising a tire rotation, and tasks 226 correspond to a service 228 comprising a routine service. The tasks 218 are designated for completion at Station A. Similarly, the tasks 222 and the tasks 226 are respectively designated for completion at Stations B and C.

With respect to determining a complexity of a service via assessment of individual tasks, the vehicle service system 102 may analyze and generate a predicted difficulty, skill level, time allotment, etc. for each individual task to complete a service. For example, the vehicle service system 102 may predict, for the tasks 218, that resetting the oil light will take ten seconds to perform, installing the new oil filter will take thirty seconds to perform, adding engine oil will take one hundred seconds to perform, and so forth. Further, in some embodiments, the vehicle service system 102 can aggregate, average, generate statistical models, or otherwise intelligently generate a holistic decision (i.e., a complexity determination) for a service based on the individual tasks. Additionally or alternatively, the vehicle service system 102 may learn and/or dynamically adjust a predicted difficulty, skill level, time allotment, etc. for individual tasks based on historic performance, vehicle data, and/or the robots and technicians available to perform the tasks.

As just described, the vehicle service system 102 can perform task-specific analyses to determine a complexity associated with performing a service. Based on such analyses, the vehicle service system 102 can determine a number of technicians and/or robots needed to perform the tasks in order to complete the service within the predefined progression rate. In addition, the vehicle service system 102 can intelligently group various tasks and correspondingly assign the grouped tasks to technicians and/or robots. For example, FIG. 2C illustrates task allocations 230a-230c assigned to various technicians and robots in accordance with one or more embodiments of the present disclosure.

As shown in FIG. 2C, the vehicle service system 102 can determine task allocations for each time-cycle during which a vehicle (in this case the vehicle 210) proceeds through the sequential stations in the vehicle service center in accordance with the predefined progression rate. In more detail, the vehicle service system 102 can generate, based on a complexity determination for the tasks 218 described above in relation to FIG. 2B, an estimated service time of twenty-three minutes at Station A for the vehicle 210. Thus, in order to facilitate completion of the oil change for the vehicle 210 at Station A within a first time-cycle according to the predefined progression rate (e.g., seven minutes per station), the vehicle service system 102 is shown in FIG. 2C as assigning Technicians A-C and Robot A to Station A to perform task sets (a)-(d), respectively. Based on such a four-way task allocation, the vehicle service system 102 predicts Technician A to complete the task set (a) in six minutes, Technician B to complete the task set (b) in five minutes, Technician C to complete the task set (c) in six and a half minutes, and Robot A to complete the task set (d) in five and a half minutes. Accordingly, the vehicle service system 102 estimates a completion time of six and a half minutes (i.e., the highest/longest estimated completion time of the individual task sets) to complete the service for the vehicle 210 at Station A. However, in other embodiments, the vehicle service system 102 may provide a different task allocation, for example, where fewer technicians (e.g., one technician) are assigned to work at one station or multiple stations.

Similarly, the vehicle service system 102 can generate, based on a complexity determination for the tasks 222 described above in relation to FIG. 2B, an estimated service time of eighteen minutes at Station B for the vehicle 210. Thus, in order to facilitate completion of the tire rotation for the vehicle 210 at Station B within a second time-cycle according to the predefined progression rate (e.g., seven minutes per station), the vehicle service system 102 is shown in FIG. 2C as assigning Technicians A, E, and C to perform task sets (e)-(g), respectively. Based on such a three-way task allocation, the vehicle service system 102 predicts Technician A to complete the task set (e) in six and a half minutes, Technician E to complete the task set (f) in six and a half minutes, and Technician C to complete the task set (g) in five minutes. Accordingly, the vehicle service system 102 estimates a completion time of six and a half minutes (i.e., the highest/longest estimated completion time of the individual task sets) to complete the service for the vehicle 210 at Station B.

Further, the vehicle service system 102 can generate, based on a complexity determination for the tasks 226 described above in relation to FIG. 2B, an estimated service time of twelve minutes at Station C for the vehicle 210. Thus, in order to facilitate completion of the routine service for the vehicle 210 at Station C within a third time-cycle according to the predefined progression rate (e.g., seven minutes per station), the vehicle service system 102 is shown in FIG. 2C as assigning Technicians B and D to perform task sets (h) and (i), respectively. Based on such a two-way task allocation, the vehicle service system 102 predicts Technician B to complete the task set (h) in five and a half minutes and Technician D to complete the task set (i) in six and a half minutes. Accordingly, the vehicle service system 102 estimates a completion time of six and a half minutes (i.e., the highest/longest estimated completion time of the individual task sets) to complete the service for the vehicle 210 at Station C.

In addition, FIG. 2C illustrates resource allocations 232a-232c comprising parts, tools, machinery, etc. that correspond to various services for the vehicle 210 at respective Stations A-C of the vehicle service center. In this regard, the vehicle service system 102 can also dynamically allocate resources such that vehicles can progress through the vehicle service center according to the predefined progression rate. As further shown, FIG. 2C illustrates that technicians and robots can move between stations from time-cycle to time-cycle as determined according to the vehicle service system 102. For example, FIG. 2C depicts the vehicle service system 102 having assigned Technician A at both Station A and Station B, in which case Technician A will proceed from Station A to Station B (as will the vehicle 210) upon completion of the task set (a) for the first time-cycle to then begin performance of the task set (e) for the second time-cycle. Additionally or alternatively, the vehicle service system 102 may dynamically allocate, during a given time-cycle, additional/fewer resources (including technicians and/or robots) for a given station to help ensure one or more services are performed within the predefined progression rate.

As additionally depicted in FIG. 2C, the vehicle service system 102 may not allocate a perfect split of tasks between technicians and/or robots (i.e., some task sets may take longer than others). In some cases, the vehicle service system 102 may determine there is no equal distribution of tasks among all the technicians and/or robots. Additionally or alternatively, the vehicle service system 102 may give preference or weight to a particular grouping of tasks (including unequal task sets) that facilitate increased efficiency, convenience, etc. (e.g., due to a similar skill involved or due to physical proximity such as pulling the hood release latch inside the vehicle below the steering wheel and subsequently resetting the oil light indicator just above the steering wheel).

Figure 2D:
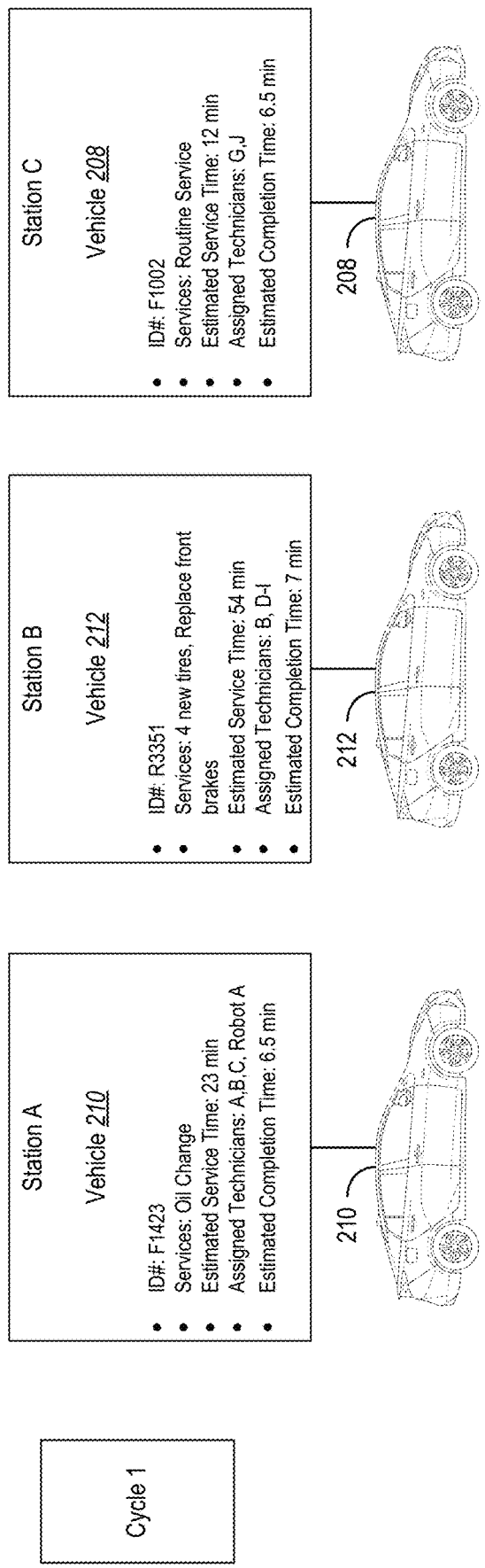
FIG. 2D illustrates task allocations for multiple vehicles during a single time-cycle in accordance with one or more embodiments.

As mentioned above, the vehicle service system 102 can perform task-specific analyses to determine a complexity associated with performing a service, and, in turn, determine a number of technicians and/or robots with corresponding task allocations. Where FIG. 2C illustrates such a task allocation for a single vehicle (the vehicle 210) over three time-cycles for Stations A-C, FIG. 2D illustrates example task allocations for vehicles 208-212 during a single time-cycle for Stations A-C in accordance with one or more embodiments of the present disclosure. Thus, FIG. 2D depicts a schematic-type snapshot of the vehicle service center at which vehicles 208-212 are positioned in respective stations for completion of one or more services.

In more detail, the vehicle service system 102 may perform a cycle analysis (as part of or in addition to the complexity determination as described above) for one or more time-cycles to determine whether to add a vehicle (e.g., the vehicle 212) to the virtual queue 202. For example, given the vehicles 208-212, the vehicle service system 102 may predict an aggregated estimated service time of eighty-nine minutes (i.e., twenty-three minutes for the vehicle 210 at Station A, plus fifty-four minutes for the vehicle 212 at Station B, plus twelve minutes for the vehicle 208 at Station C). Thus, in cycle 1 and for this particular combination of vehicles 208-212, the vehicle service system 102 may determine if there are sufficient technicians and/or robots available to perform eighty-nine minutes of vehicle service within the time-cycle set according to the predefined progression rate (e.g., seven minutes).

As shown in FIG. 2D, the vehicle service system 102 has accordingly determined a sufficient/capable workforce of technicians and/or robots is available to handle the addition of the vehicle 212 to the virtual queue, and therefore allocated Technicians A-C and Robot A for the vehicle 210 at Station A, Technicians B and D-I for the vehicle 212 at Station B, and Technicians G and J for the vehicle 208 at Station C. In other embodiments, however, a particular combination of vehicles may not comport with the predefined progression rate. For example, the vehicle service system 102 may predict an aggregated estimated service time of some amount that exceeds a threshold time (e.g., a maximum service bandwidth for the vehicle service center based on available technicians and/or robots). In this scenario, the vehicle service system 102 may refrain from adding the vehicle to the virtual queue 202 and iteratively consider alternative permutations of vehicles that may comport with the predefined progression rate as just described.

As discussed above, the vehicle service system 102 may perform one or more cycle analyses to determine whether to add a vehicle to the virtual queue 202. FIG. 2E illustrates example task allocations for vehicles 208-216 over three time-cycles for Stations A-C in accordance with one or more embodiments of the present disclosure. As shown, cycle 1 in FIG. 2E is the same as cycle 1 depicted in FIG. 2D. In cycle 2 of FIG. 2E, the vehicle service system 102 progresses the vehicle 210 from Station A to Station B where the vehicle 210 receives a tire rotation. Similarly, in cycle 2 the vehicle service system 102 progresses the vehicle 212 from Station B to Station C where the vehicle 212 receives various replacement parts and a routine service. In addition, the vehicle 208 has exited the vehicle service center after cycle 1, and the vehicle service system 102 progresses into Station A vehicle 214 where the vehicle 214 receives no vehicle service (e.g., no service for the vehicle 214 applies to Station A).

In cycle 3 of FIG. 2E, the vehicle service system 102 progresses the vehicle 214 from Station A to Station B where the vehicle 214 receives two new tires, a front brake job, and a replacement stud on a wheel hub. Similarly, in cycle 3 the vehicle service system 102 progresses the vehicle 210 from Station B to Station C where the vehicle 210 receives a routine service. In addition, the vehicle 212 has exited the vehicle service center after cycle 2, and the vehicle service system 102 progresses into Station A vehicle 216 where the vehicle 216 receives an oil change.

As shown in FIG. 2E, the vehicle service system 102 performs one or more cycle analyses over multiple time-cycles to determine whether a particular permutation, not just a combination, of vehicles comports with the predefined progression rate. For example, even though a particular permutation of vehicles satisfies the predefined progression rate for one time-cycle, the particular permutation of vehicles may not comport with the predefined progression rate in one or more other time-cycles (i.e., a previous or subsequent time-cycle). For instance, were the vehicle service system 102 to swap the ordering of the vehicle 212 and the vehicle 210 in the virtual queue 202, cycle 1 and cycle 2 would comport with the predefined progression rate. However, cycle 3 may not comport with the predefined progression rate (e.g., due to an aggregated estimated service time for the vehicle 216, the vehicle 214 and the vehicle 212 of one hundred twenty-three minutes that may exceed a threshold time). As such, the vehicle service system 102 in some embodiments determines to add a vehicle to the virtual queue 202 if, over the course of n time-cycles to progress through the vehicle service center, each permutation of vehicles comprising the query vehicle can satisfy the predefined progression rate for each time-cycle as described above. If not, the vehicle service system 102 may refrain from adding the query vehicle to the virtual queue 202 and iteratively consider alternative permutations of vehicles that may comport with the predefined progression rate for each time-cycle as just described.

Figure 3A:
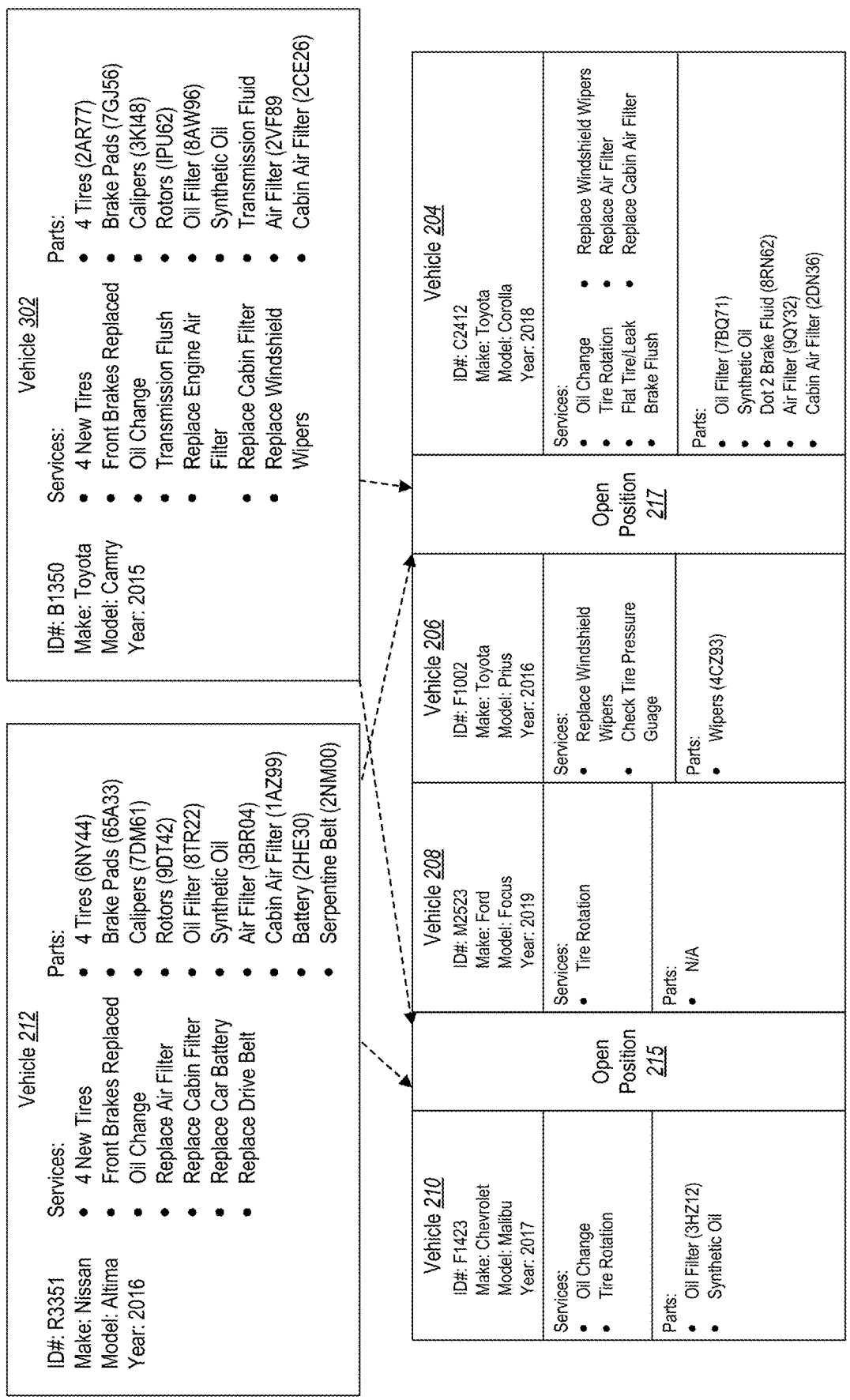
FIG. 3A illustrates a virtual management queue in accordance with one or more embodiments.

As mentioned above, the vehicle service system 102 can determine whether to add a vehicle to a virtual queue based on a complexity assessment of one or more services comprising individual tasks. FIG. 3A illustrates the virtual queue 202 that the vehicle service system 102 dynamically manages in accordance with one or more embodiments of the present disclosure. Like in FIG. 2A, FIG. 3A depicts a portion of the virtual queue 202 including service positions filled by vehicles 204-210 and open positions 215-217. Further, FIG. 3A illustrates an example scenario in which the vehicle service system 102 determines whether to add multiple vehicles, in this case the vehicle 212 and a vehicle 302 to the virtual queue 202 at the open positions 215-217.

In accordance with the foregoing description of FIG. 2A and with respect to the open position 217 of FIG. 3A, the vehicle service system 102 may determine that each of the vehicle 204, the vehicle 212, and the vehicle 302 are associated with high complexities. Thus, when analyzed in the back-to-back positioning (i.e., the vehicle 204 of high complexity followed immediately by one of the vehicle 212 or the vehicle 302 also of high complexity), the vehicle service system 102 may generate predicted progression rates for these particular orderings of vehicles through the sequential stations that exceed the predefined progression rate. In contrast for the decision to add one of the vehicle 212 or the vehicle 302 to the virtual queue 202 at the open position 215, the vehicle service system 102 may determine that adjacent to the open position 215, vehicles 208-210 are associated with low complexity. Thus, when analyzed with either of the vehicle 212 or the vehicle 302 of high complexity sandwiched between the vehicles 208-210 of low complexity, the vehicle service system 102 may generate predicted progression rates for these particular orderings of vehicles through the sequential stations that satisfy the predefined progression rate. As a result, the vehicle service system 102 may refrain from adding either of the vehicle 212 or the vehicle 302 to the open position 217. Instead, the vehicle service system 102 may add one of the vehicle 212 or the vehicle 302 to the open position 215.

Figure 3B:
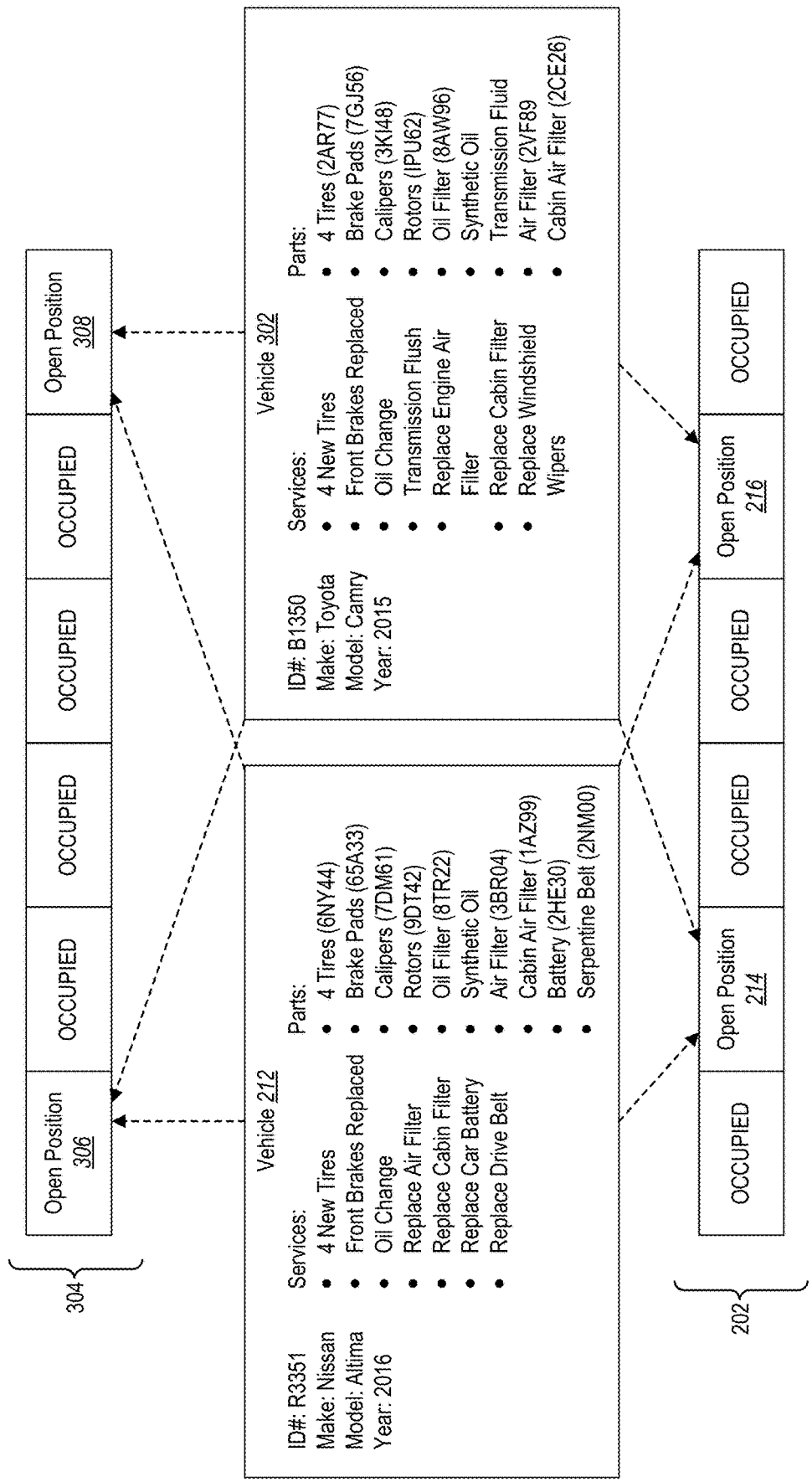
FIG. 3B illustrates multiple virtual management queues in accordance with one or more embodiments.

As just described, the vehicle service system 102 may determine whether to add multiple vehicles to a virtual queue. In addition, FIG. 3B illustrates the vehicle service system 102 determining whether to add multiple vehicles among multiple virtual queues corresponding to respective vehicle service centers in accordance with one or more embodiments of the present disclosure. For example, FIG. 3B depicts the vehicle service system 102 determining whether to add one or both of the vehicle 212 and the vehicle 302 to the open positions 215-217 of the virtual queue 202 for a first vehicle service center as just described in relation to FIG. 3A. Additionally, FIG. 3B depicts the vehicle service system 102 determining whether to add one or both of the vehicle 212 and the vehicle 302 to the open positions 306-308 of a virtual queue 304 for a second vehicle service center different from the first vehicle service center.

For instance, if the vehicle service system 102 adds the vehicle 212 to the open position 215 of the virtual queue 202 and refrains from adding the vehicle 302 to the open position 217, the vehicle service system 102 may subsequently determine whether adding the vehicle 302 to one of the open positions 306-308 of the virtual queue 304 will comport with the predefined progression rate. Additionally or alternatively, the vehicle service system 102 may determine that either of the vehicle 212 or the vehicle 302 at the open position 215 of the virtual queue 202 will comport with the predefined progression rate. However, the vehicle service system 102 may further determine one or more weighted factors affecting which of the vehicle 212 or the vehicle 302 is added (or not added) to the open position 215 versus one of the open positions 306-308. Such factors may include, for example, a relative proximity between the vehicles and a geographic location of the vehicle service center, user preference, a destination mode including a particular vehicle service center (e.g., for selectively dispatching a transportation request to the transportation provider with instructions to transport a requestor to a destination location within some threshold distance or time to the vehicle service center), a complexity of one or more services associated with the vehicles, and/or an availability of parts, machinery, tools, etc. Other suitable factors may also include an urgency of a service, traffic conditions, weather conditions, an amount of excess/insufficient transportation providers in a given geographic area, a number of transportation requests, etc. Thus, in some embodiments, the vehicle service system 102 can analyze multiple virtual queues for adding a vehicle thereto based on a variety of factors, including whether the addition of the vehicle at a particular position within a virtual queue will comport with the predefined progression rate.

Additionally or alternatively, in some embodiments, the vehicle service system 102 can add a vehicle to multiple virtual queues (e.g., the virtual queue 202 and the virtual queue 304). For example, the vehicle service system 102 can add the vehicle 212 to the open position 215 of the virtual queue 202 at the first vehicle service center in accordance with the above description and, as a back-up plan or secondary option, reserve the open position 306 of the virtual queue 304 at the second vehicle service center. In this manner, the vehicle service system 102 can dynamically adjust to real-time changes for a vehicle service center, a virtual queue, the transportation provider, and/or various factors mentioned above to help ensure a vehicle receives proper, timely vehicle service that is also flexible and user friendly for transportation providers.

As mentioned above, the vehicle service system 102 can dynamically dispatch a vehicle to a vehicle service center based on an intelligent determination to add a vehicle to a virtual queue. In accordance with one or more embodiments of the present disclosure, FIGS. 4A-4F illustrate a transportation provider device 402 and user interfaces 404a-404f, which include an online indicator 405. As explained below, the vehicle service system 102 provides customized notices to the transportation provider device 402 and/or a vehicle associated with the transportation provider device 402 based on one or more analyses with respect to a service for the associated vehicle.

FIGS. 4A-4F also respectively depict the transportation provider device 402 comprising a transportation matching application for the dynamic transportation matching system 103. In some embodiments, the transportation matching application comprises computer-executable instructions that cause the transportation provider device 402 to perform certain actions depicted in FIGS. 4A-4F, such as presenting a graphical user interface of the transportation matching application. Rather than refer to the dynamic transportation matching system 103 or the vehicle service system 102 as performing the actions depicted in FIGS. 4A-4F below, this disclosure will generally refer to the transportation provider device 402 for simplicity.

Figure 4B:
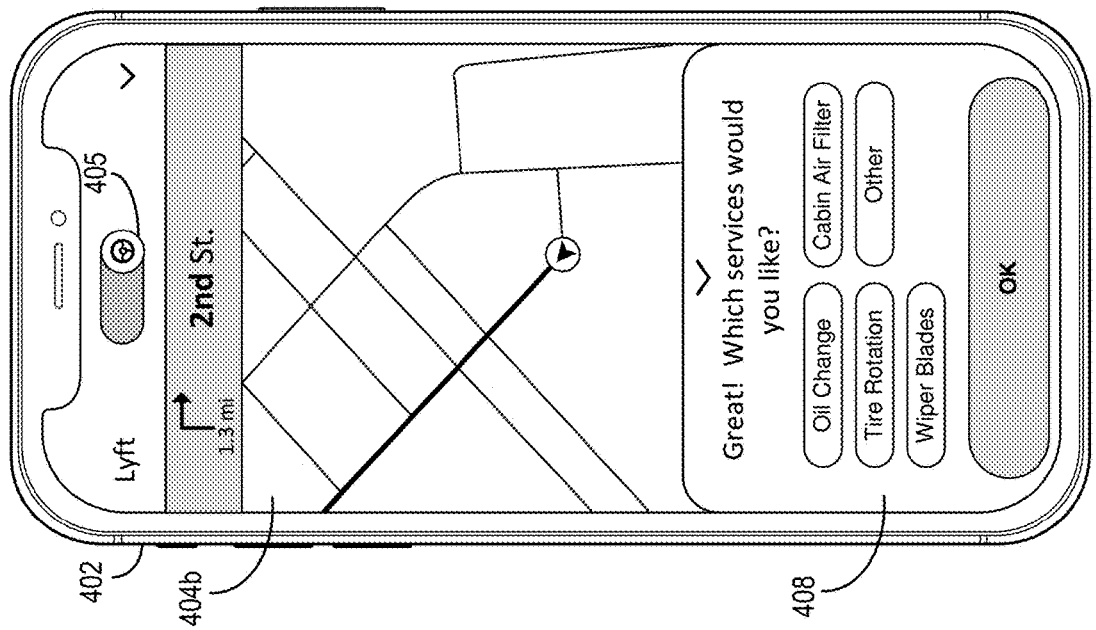
FIGS. 4A-4F illustrate a transportation provider device presenting graphical user interfaces that relate to dynamically dispatching a vehicle to a vehicle service center.
Figure 4A:
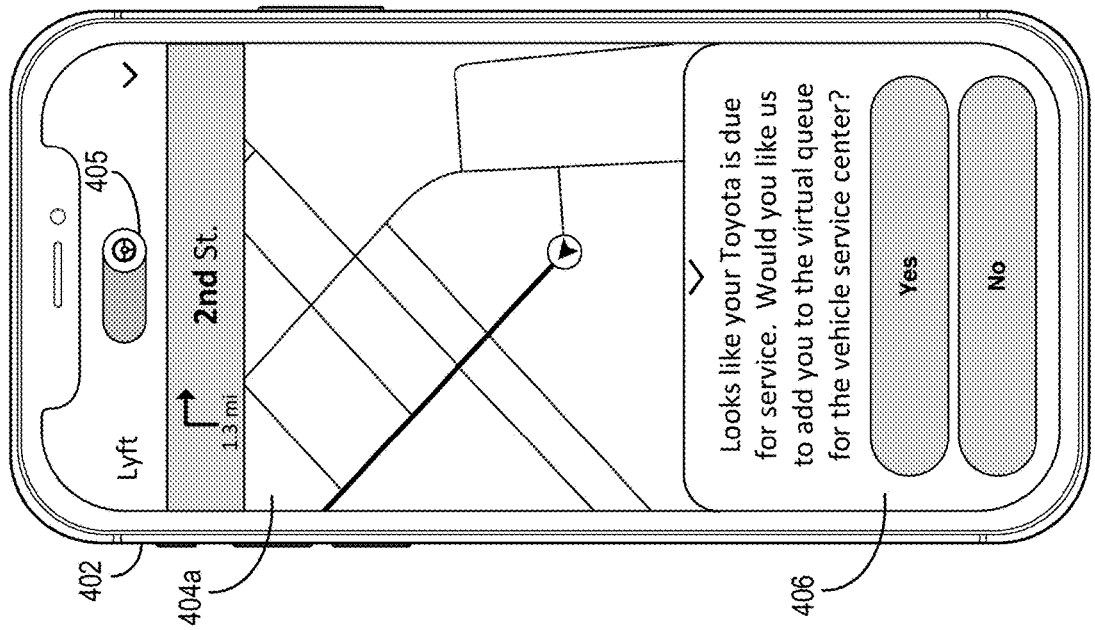

As shown in FIG. 4A, for example, the user interface 404a includes a customized vehicle service notice 406 indicating the vehicle associated with the transportation provider device 402 is due for service at a vehicle service center. The transportation provider device 402 can display the customized vehicle service notice 406 when the transportation provider is online (i.e., as indicated by the online indicator 405 in the online position). However, in some embodiments, the transportation provider device 402 can display the customized vehicle service notice 406 when the transportation provider is offline. In more detail, the customized vehicle service notice 406 can provide the make, model, year, and/or other information as applicable to help convey the individualized nature of the customized vehicle service notice 406. In addition, the customized vehicle service notice 406 can include one or more accept/decline elements (i.e., the "Yes" and "No" user interface buttons) that indicate whether the transportation provider agrees to be added to a virtual queue for vehicle service.

In response to receiving a user input at the "Yes" button of the customized vehicle service notice 406, FIG. 4B illustrates that the transportation provider device 402 can display the user interface 404b comprising a service menu 408. As shown, the service menu 408 includes one or more selectable service options that the transportation provider may wish performed on the vehicle. In some embodiments, the service menu 408 may include mandatory services, in which case, the transportation provider device 402 may pre-select or otherwise indicate such mandatory services. In these or other embodiments, the service menu 408 includes optional vehicle services that a user may prefer in addition to any mandatory services (whether or not presented in the service menu 408) that the vehicle service system 102 has identified. The transportation provider device 402 can receive a selection of vehicle services, for example, by tapping one or more user interface buttons respectively indicating a service for the vehicle. After the selection of any listed services, the transportation provider device 402 can receive an additional user input at a confirmation element (i.e., the "OK" user interface button) to confirm the vehicle service system 102 should accordingly determine how to add the vehicle to the virtual queue.

Figure 4D:
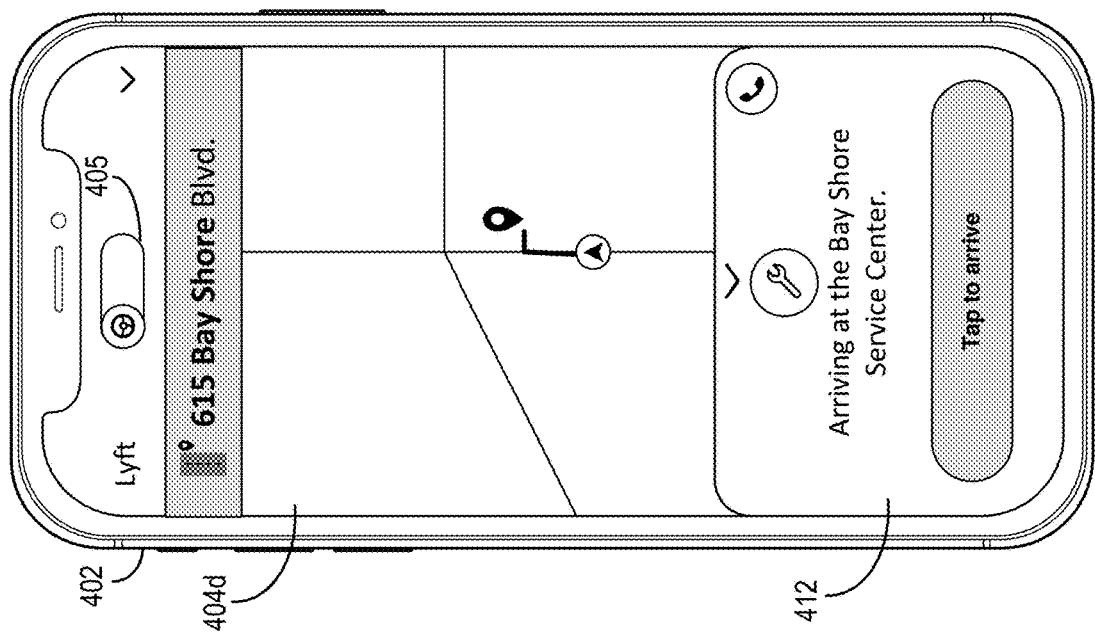
Figure 4C:
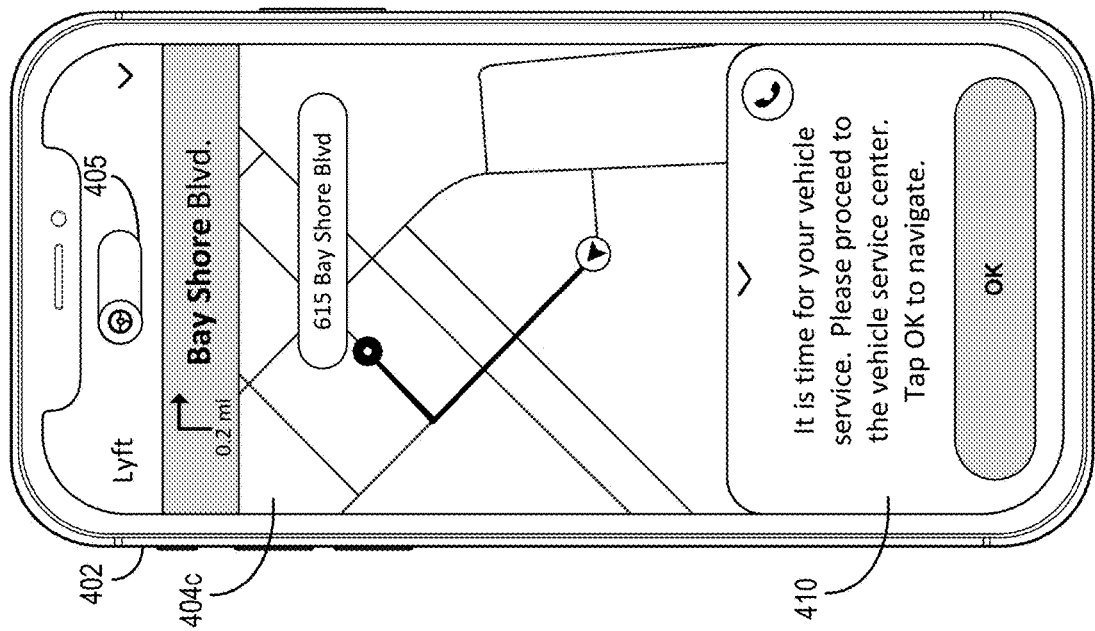

In turn, FIG. 4C illustrates that the transportation provider device 402 can display the user interface 404c comprising a dynamic dispatch notice 410 indicating a request that the vehicle navigate to the vehicle service center in accordance with a determined position within the virtual queue. In addition, FIG. 4C illustrates that the transportation provider device 402 can switch the online indicator 405 from the online position to the offline position for removing the transportation provider as an eligible match for providing transportation to requestors. In some embodiments, the vehicle service system 102 may not dispatch the vehicle to the vehicle service center immediately following the user input at the confirmation element of FIG. 4B. For example, the vehicle service system 102 may, following some interval of time after receiving the user input at the confirmation element of FIG. 4B, dispatch the vehicle to the vehicle service center in accordance with a determined position of the virtual queue. Once dispatched, FIG. 4C illustrates the transportation provider device 402 displays the dynamic dispatch notice 410 as including a selectable navigation option to help navigate the transportation provider to the vehicle service center and a selectable phone icon for contacting the vehicle service center (e.g., to schedule another time/day for service, describe certain vehicle issues, inform of likely tardiness, etc.).

Based on receiving a user input at the selectable navigation option of the dynamic dispatch notice 410 and the transportation provider device nearing the location of the vehicle service center, FIG. 4D illustrates that the transportation provider device 402 can display the user interface 404d comprising an arrival notice 412. The arrival notice 412 includes a selectable option to indicate arrival. In some embodiments, in response to a user input at the selectable option indicating arrival, the vehicle service system 102 may proceed to check-in the vehicle and begin performance of one or more services according to the virtual queue and the predefined progression rate. Additionally or alternatively, in response to the user input at the selectable option indicating arrival, the vehicle service system 102 may indicate one or more instructions for placement of the vehicle, waiting instructions, complimentary services for the transportation provider while waiting, an estimated completion time, etc.

Figure 4F:
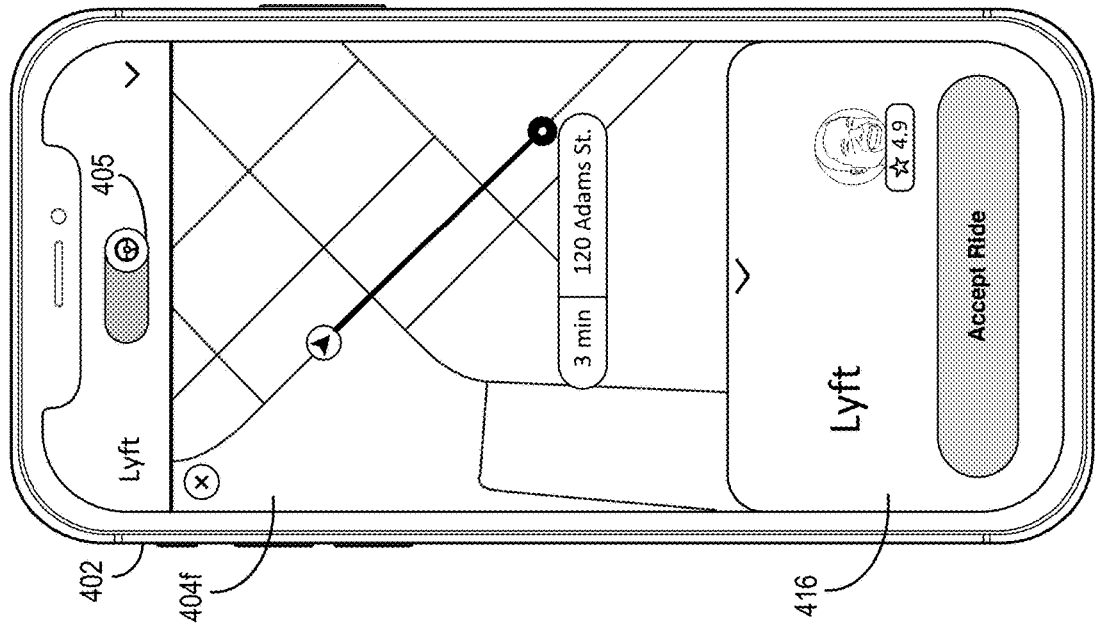
Figure 4E:
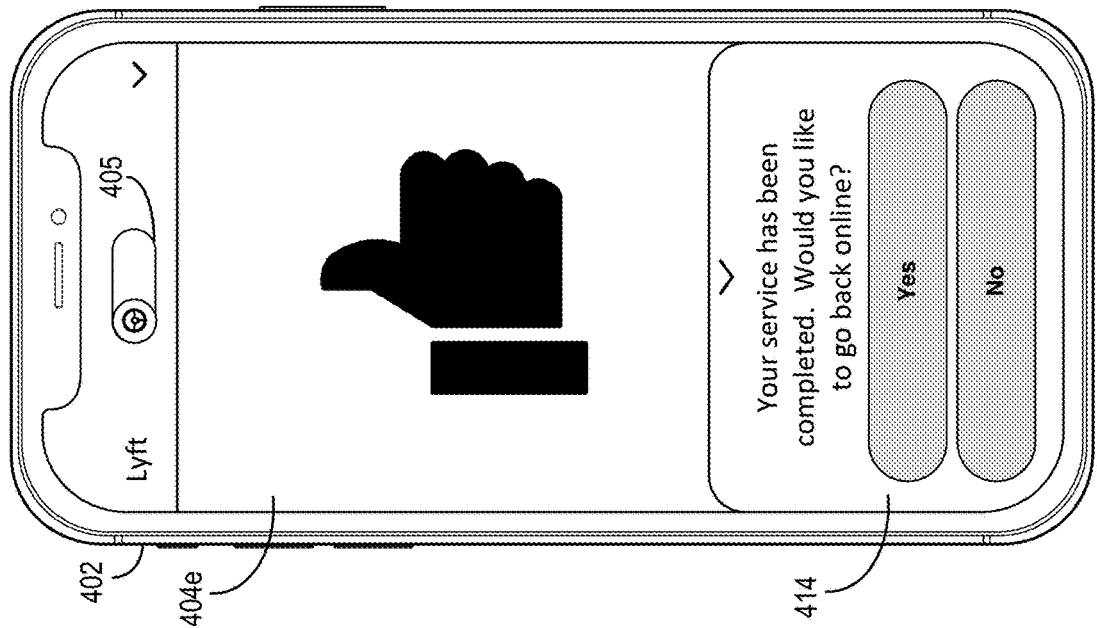

After the vehicle service system 102 checks-out the vehicle from the vehicle service center, having caused the performance of the one or more services for the vehicle, FIG. 4E illustrates that the transportation provider device 402 can display the user interface 404e comprising an indication that the vehicle services are complete and the vehicle is ready to go (e.g., the "thumbs up" icon). In addition, the transportation provider device 402 can display the user interface 404e comprising an online notice 414 requesting the transportation provider to indicate a choice of going back online to be eligible for matching with transportation requests of requestors or else remain offline as indicated by the online indicator 405.

Based on a user input to go back online via the online notice 414, FIG. 4F illustrates that the transportation provider device 402 can display the user interface 404f with a corresponding change to the online indicator 405 in the online position and further including a transportation request 416. The transportation request 416 comprises a selectable option to accept the ride-assignment, which in this case includes a pickup location for a requestor three minutes away at 120 Adams St.

Figure 5B:
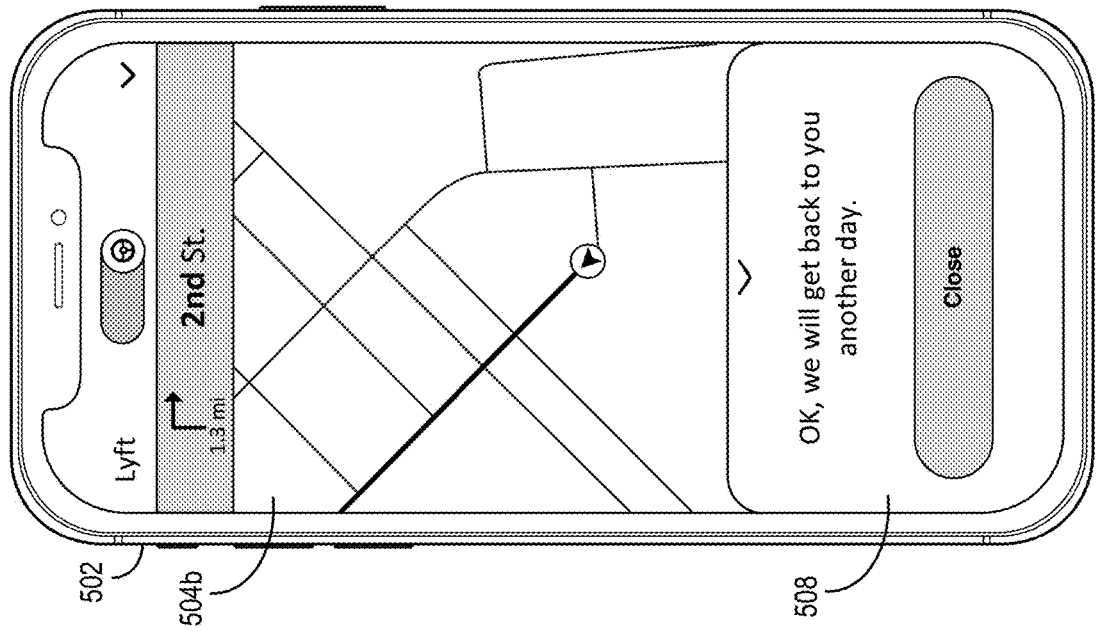
FIGS. 5A-5B illustrate a transportation provider device presenting graphical user interfaces that relate to postponement of a vehicle service in accordance with one or more embodiments.
Figure 5A:
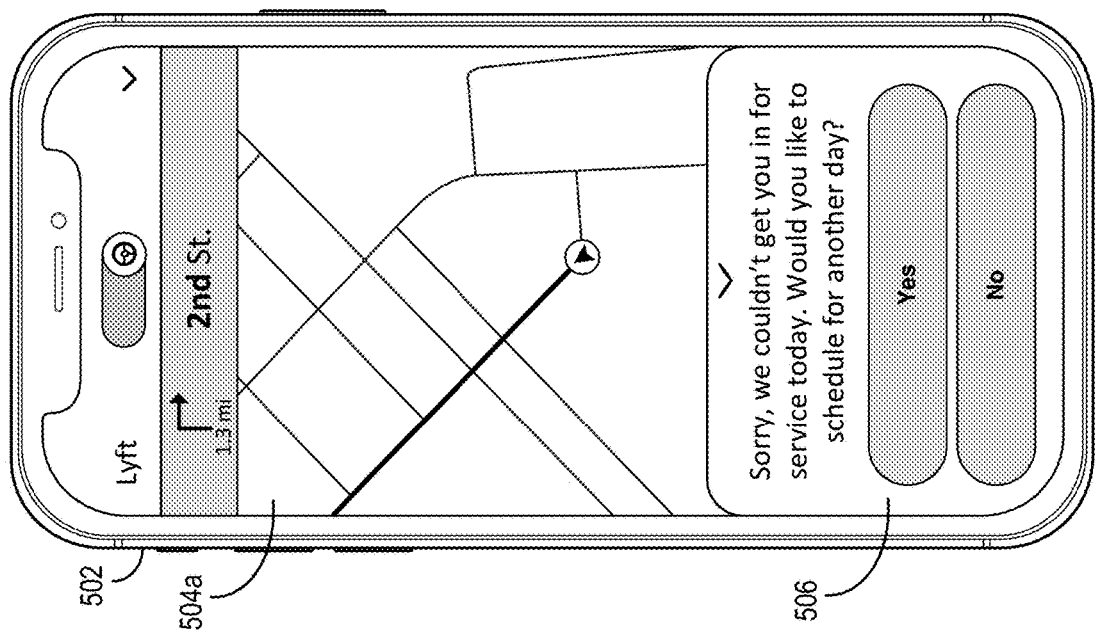

As mentioned above, the vehicle service system 102 can dynamically dispatch a vehicle to a vehicle service center based on an intelligent determination to add a vehicle to a virtual queue. However, the transportation provider may choose, for various reasons, not to accept vehicle service and be added to the virtual queue as requested in FIG. 4A. In accordance with one or more embodiments of the present disclosure, FIGS. 5A-5B illustrate a transportation provider device 502 and user interfaces 504a-504b that relate to postponement of a service. As explained below, the vehicle service system 102 provides customized notices to the transportation provider device 502 and/or a vehicle associated with the transportation provider device 502 based on one or more analyses with respect to a service for the associated vehicle and a user input to not receive a service.

FIGS. 5A-5B also respectively depict the transportation provider device 502 comprising a transportation matching application for the dynamic transportation matching system 103. In some embodiments, the transportation matching application comprises computer-executable instructions that cause the transportation provider device 502 to perform certain actions depicted in FIGS. 5A-5B, such as presenting a graphical user interface of the transportation matching application. Rather than refer to the dynamic transportation matching system 103 or the vehicle service system 102 as performing the actions depicted in FIGS. 5A-5B below, this disclosure will generally refer to the transportation provider device 502 for simplicity.

As shown in FIG. 5A, the transportation provider device 502 can display the user interface 504a that comprises a schedule request 506. The schedule request 506 can include selectable options to receive service another day or otherwise decline service (i.e., the "Yes" and "No" user interface buttons). In response to receiving an indication of accepting service another day, FIG. 5B illustrates the user interface 504b comprising a confirmation notice 508 indicating the vehicle service system 102 will provide an additional opportunity for the vehicle to receive service. Additionally or alternatively, the confirmation notice 508 may indicate selectable options with more definitive dates and times that the transportation provider may select for reserving a position within a virtual queue of the vehicle service system 102.

As mentioned above, the vehicle service system 102 can dynamically dispatch vehicles to a vehicle service center based on a variety of factors, in addition to vehicle data and vehicle service center data. FIG. 6 illustrates a management user interface 604 on a client device 602 for managing the virtual queue for a vehicle service center in accordance with one or more embodiments of the present disclosure. As shown, the management user interface 604 comprises a number of columns with various inputs regarding data of the transportation provider, an associated vehicle, service history (e.g., the "notes"), arrival time, service progress, among others (as denoted by the ellipses).

In addition, the management user interface 604 comprises a position-adjustment tab 606 for each vehicle in the virtual queue. In more detail, the position-adjustment tab 606 allows a user (e.g., a vehicle service center manager) to provide a user input at the position-adjustment tab 606 and correspondingly modify a position of the vehicle within the virtual queue. In response to such a modification, the vehicle service system 102 can alter the manner of dispatch to one or more vehicles affected by the modification to the virtual queue. For example, the vehicle service system 102 may provide an earlier/later dispatch notice or otherwise provide an updated dispatch notice to a transportation provider device via the dynamic transportation matching application on the transportation provider device.

As an example, the management user interface 604 may receive an input at the position-adjustment tab 606 for the 2019 Chevrolet Volt associated with Luke Holmes to move this vehicle between vehicles associated with Ben Johnson and Adi Green. In response to such a modification, the vehicle service system 102 may provide an earlier dispatch notice to Luke Holmes (or update a previously provided dispatch notice) and provide a later dispatch notice to Ben Johnson (or update a previously provided dispatch notice). Further, in some embodiments, the management user interface 604 may disallow positional adjustment of vehicles in the virtual queue once in-service as reflected in the "Progress Time" column. Additional features of the management user interface 604 are herein contemplated. For example, the management user interface 604 can include various tabs of vehicle categories in the virtual queue (e.g., "Active and Upcoming," "Check In," "In Progress," "Completed," "Canceled," etc.). Further, information provided within the management user interface 604 in some embodiments is searchable.

Figure 7:
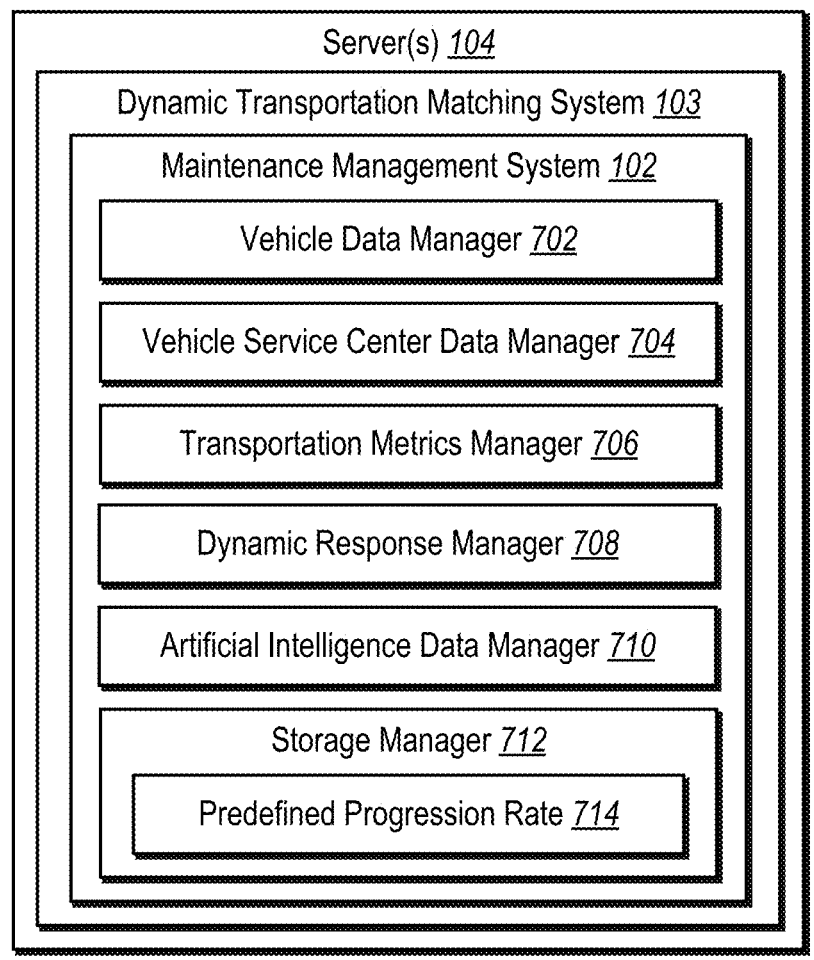
FIG. 7 illustrates a schematic diagram of a vehicle service system in accordance with one or more embodiments.

FIG. 7 illustrates a schematic diagram of an example embodiment of the vehicle service system 102 arranged according to at least one embodiment of the present disclosure. As shown in FIG. 7, the vehicle service system 102 includes various components for performing the processes and features described herein. For example, as shown in FIG. 7, the vehicle service system 102 includes a vehicle data manager 702, a vehicle service center data manager 704, a transportation metrics manager 706, a dynamic response manager 708, an artificial intelligence data manager 710, and a storage manager 712.

Each of the components 702-712 of the vehicle service system 102 can be implemented using a computing device including at least one processor executing instructions that cause the performance of the processes described herein. In some embodiments, the components 702-712 of the vehicle service system 102 can be implemented on a single server or across multiple servers. Additionally or alternatively, a combination of one or more server devices and one or more computing devices can implement the components described herein in a different arrangement than illustrated in FIG. 7. Additionally or alternatively, the components described herein can comprise a combination of computer-executable instructions and hardware.

As illustrated in FIG. 7, the vehicle service system 102 includes the vehicle data manager 702. In one or more embodiments, the vehicle data manager 702 handles the sending, receiving, storing, and/or requesting of vehicle data. For example, the vehicle data manager 702 can initiate from the vehicle service system 102 a request of vehicle data to the transportation provider device or associated vehicle (e.g., to determine a complexity of one or more services for the vehicle). Additionally, the vehicle data manager 702 can receive vehicle data transmitted from the vehicle and/or the transportation provide device to the vehicle service system 102.

Also as illustrated in FIG. 7, the vehicle service system 102 includes the vehicle service center data manager 704. In some embodiments, the vehicle service center data manager 704 handles the sending, receiving, storing and/or requesting of vehicle service center data. For example, the vehicle service center data manager 704 can initiate from the vehicle service system 102 a request of vehicle service center data of the vehicle service center (e.g., data associated with the service queue, a progression of vehicles relative to a predefined progression rate, etc.). Additionally, the vehicle service center data manager 704 can receive vehicle service center data transmitted from a client device (including a manager client device via the management user interface 604) to the vehicle service system 102.

As further illustrated in FIG. 7, the vehicle service system 102 includes the transportation metrics manager 706. In some embodiments, the transportation metrics manager 706 handles the sending, receiving, storing and/or generating of transportation metrics. For example, the transportation metrics manager 706 can generate a forecasted amount of transportation requests given a future time, location, and/or historic demand. Additionally, the transportation metrics manager 706 can relay the forecasted amount of transportation requests to the vehicle service system 102, including other components of the vehicle service system 102 such as the dynamic response manager 708.

Also as illustrated in FIG. 7, the vehicle service system 102 includes the dynamic response manager 708. In some embodiments, the dynamic response manager 708 can provide a dynamic response for servicing vehicles in response to changes to the vehicle service center data, transportation metrics, and/or acceptance of the service request. For example, the dynamic response manager 708 can modify vehicle service work orders and dispatch notifications, reallocate resources within the vehicle service center, etc. Additionally, the dynamic response manager 708 can modify tasks assigned to various technicians and/or technician pools (e.g., technician pools), modify the virtual queue (e.g., the virtual queue 202) to reorder the vehicles entering the vehicle service center, etc.

As further illustrated in FIG. 7, the vehicle service system 102 includes the artificial intelligence data manager 710. In some embodiments, the artificial intelligence data manager 710 handles the model selection, training, learning, validation, and/or other aspects of machine learning. For example, the artificial intelligence data manager 710 can iteratively analyze post-service performance of a vehicle to determine a next service process and/or distribution of tasks to perform such service. Additionally, the artificial intelligence data manager 710 can learn a vehicle on-the-fly in the vehicle service center to identify an unknown vehicle and provide a first service most fitting for the vehicle and its current condition.

Additionally illustrated in FIG. 7, the vehicle service system 102 includes the storage manager 712 configured to store any suitable type of data. As shown, the storage manager 712 can store a predefined progression rate 714, a parameter dictating how long each vehicle can spend at each station within the vehicle service center. In some embodiments, the storage manager 712 can store this parameter and/or any other parameters. Additionally, the storage manager 712 can permit adjustment, configuration, and/or optimization of the predefined progression rate 714 and other parameters as applicable.

Figure 8:
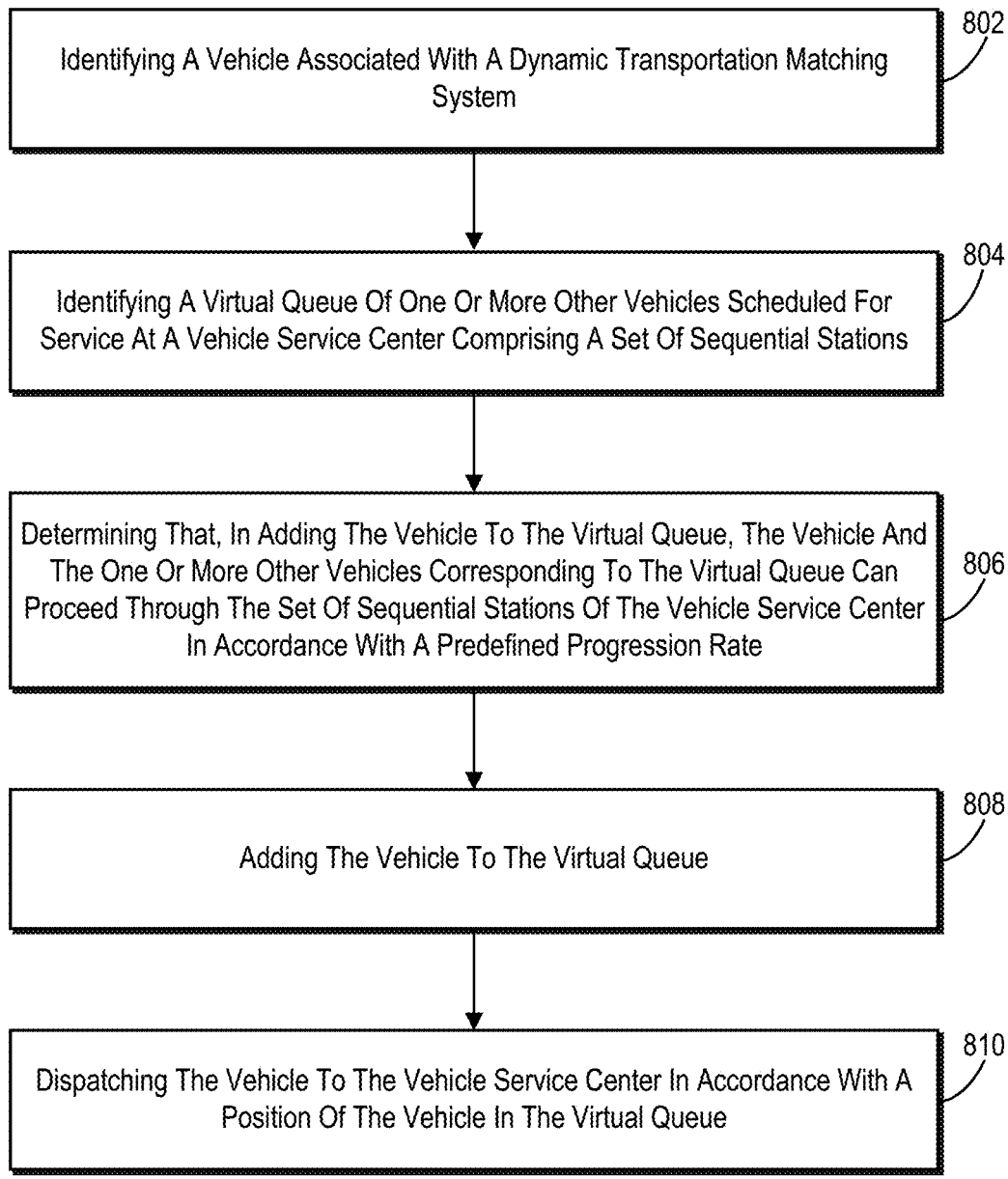
FIG. 8 illustrates a flowchart of a series of acts in a method to dispatch a vehicle to a vehicle service center in accordance with one or more embodiments.

FIGS. 1-7, the corresponding text, and the examples provide several different systems, methods, techniques, components, and/or devices of the vehicle service system 102 in accordance with one or more embodiments. In addition to the above description, one or more embodiments can also be described in terms of flowcharts including acts for accomplishing a particular result. For example, FIG. 8 illustrates a flowchart of a series of acts 800 for dispatching a vehicle to a vehicle service center in accordance with one or more embodiments of the present disclosure. The vehicle service system 102 may perform one or more acts of the series of acts 800 in addition to or alternatively to one or more acts described in conjunction with other figures. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium and/or one or more memory devices can comprise instructions that, when executed by one or more processors, cause a computing device or system to perform the acts of FIG. 8. Accordingly, in some embodiments, a system can perform the acts of FIG. 8.

As shown, the series of acts 800 includes an act 802 of identifying a vehicle associated with a dynamic transportation matching system, wherein a service is associated with the vehicle. The series of acts 800 further includes an act 804 of identifying a virtual queue of one or more other vehicles scheduled for service at a vehicle service center comprising a set of sequential stations, wherein vehicles progress through the set of sequential stations in accordance with a predefined progression rate. Further, an act in the series of acts 800 includes an act 806 of determining that, in adding the vehicle to the virtual queue, the vehicle and the one or more other vehicles corresponding to the virtual queue can proceed through the set of sequential stations of the vehicle service center in accordance with the predefined progression rate. In addition, an act in the series of acts 800 includes an act 808 of adding the vehicle to the virtual queue with the one or more other vehicles scheduled for service at the vehicle service center. Another act in the series of acts 800 includes an act 810 of dispatching the vehicle to the vehicle service center in accordance with a position of the vehicle in the virtual queue.

It is understood that the outlined acts in the series of acts 800 are only provided as examples, and some of the acts may be optional, combined into fewer acts, or expanded into additional acts without detracting from the essence of the disclosed embodiments. As an example of one or more additional or alternative acts not shown in FIG. 8, act(s) in the series of acts 800 may include: providing, for display on a client device, a management user interface for managing the virtual queue for the vehicle service center; detecting, based on one or more interactions with the management user interface, one or more changes to the virtual queue, the one or more changes comprising an adjusted position of a second vehicle in the virtual queue; and dispatching the second vehicle to the vehicle service center in accordance with the adjusted position of the second vehicle in the virtual queue.

As another example of one or more additional or alternative acts not shown in FIG. 8, act(s) in the series of acts 800 may include: identifying a second vehicle with a service; determining that, in adding the second vehicle to the virtual queue, the second vehicle and the one or more other vehicles corresponding to the virtual queue cannot move through the set of sequential stations in accordance with the predefined progression rate; and refraining from adding the second vehicle to the virtual queue.

In yet another example of one or more additional or alternative acts not shown in FIG. 8, act(s) in the series of acts 800 may include: identifying an open position in the virtual queue; identifying the one or more other vehicles from one or more positions adjacent the open position in the virtual queue; and adding the vehicle to the open position in response to determining that adding the vehicle to the open position in the virtual queue will allow the vehicle and the one or more other vehicles to move through the set of sequential stations in accordance with the predefined progression rate.

Still further, another example of one or more additional or alternative acts not shown in FIG. 8, act(s) in the series of acts 800 may include: analyzing information associated with the service for the vehicle and information associated with one or more services for the one or more other vehicles to determine a complexity of the service for the vehicle and a complexity for each of the one or more services for the one or more other vehicles; and based on the complexity of the service for the vehicle and the complexity of each of the one or more services for the one or more other vehicles, determining that adding the vehicle to the virtual queue will allow the vehicle and one or more other vehicles corresponding to the virtual queue to move through the set of sequential stations at a predefined progression.

In an additional example of one or more additional or alternative acts not shown in FIG. 8, act(s) in the series of acts 800 may include: based on the complexity of the service for the vehicle and the complexity of each of the one or more services for the one or more other vehicles, determining a predicted progression rate at which the vehicle and the one or more other vehicles will move through the set of sequential stations; and comparing the predicted progression rate to the predefined progression rate to determine that adding the vehicle to the virtual queue will allow the vehicle and the one or more other vehicles to move through the set of sequential stations in accordance with the predefined progression rate.

In another example of one or more additional or alternative acts not shown in FIG. 8, act(s) in the series of acts 800 may include: determining a first complexity associated with the service for the vehicle; determining a second complexity associated with a second service for a second vehicle of the one or more other vehicles in the virtual queue, wherein the second complexity is determined to be greater than the first complexity; determining a third complexity associated with a third service for a third vehicle of the one or more other vehicles in the virtual queue, wherein the third complexity is determined to be greater than the first complexity; and adding the vehicle to an open position in the virtual queue between a position of the second vehicle and a position of the third vehicle based at least on the second complexity being greater than the first complexity and the third complexity being greater than the first complexity.

Figure 9:
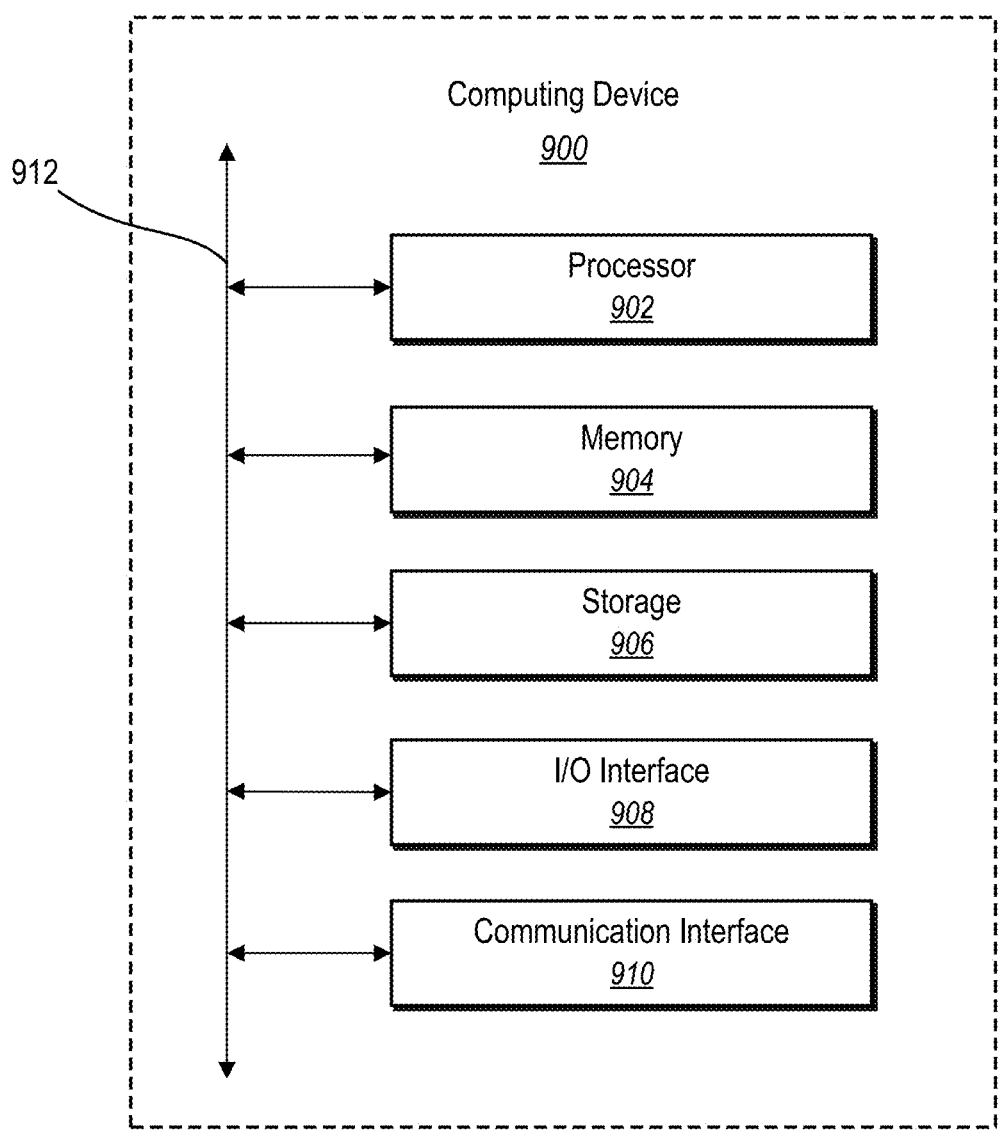
FIG. 9 illustrates a block diagram of an example computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 104, a transportation provider device, a vehicle service center manager client device, etc.). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of the computing device 900 to each other.

Figure 10:
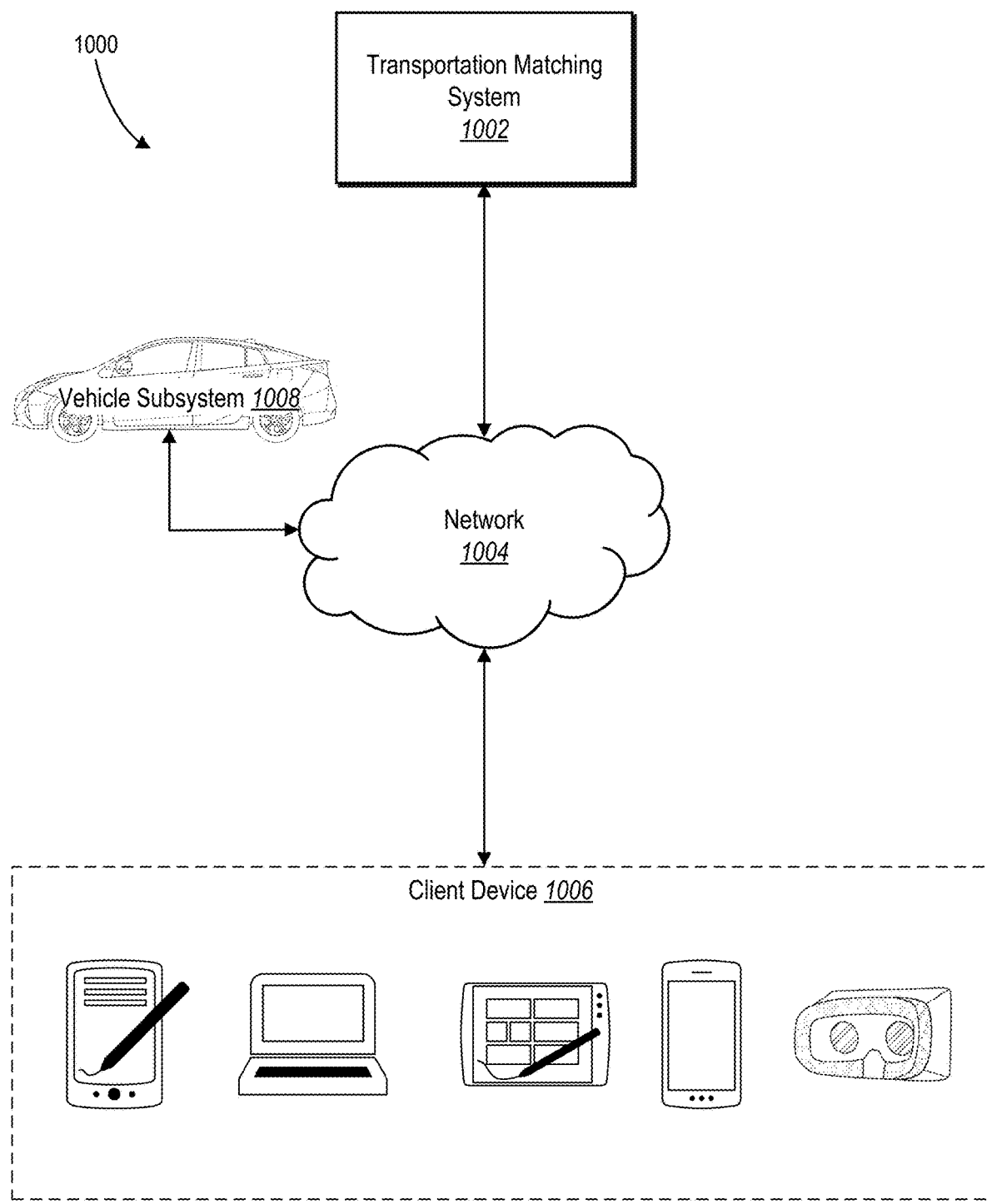
FIG. 10 illustrates an example network environment of a transportation matching system in accordance with one or more embodiments.

FIG. 10 illustrates an example network environment 1000 of a transportation matching system (e.g., the dynamic transportation matching system 103). The network environment 1000 includes a client device 1006, a transportation matching system 1002, and a vehicle subsystem 1008 connected to each other by a network 1004. Although FIG. 10 illustrates a particular arrangement of the client device 1006, the transportation matching system 1002, the vehicle subsystem 1008, and the network 1004, this disclosure contemplates any suitable arrangement of the client device 1006, the transportation matching system 1002, the vehicle subsystem 1008, and the network 1004. As an example, and not by way of limitation, two or more of the client device 1006, the transportation matching system 1002, and the vehicle subsystem 1008 communicate directly, bypassing the network 1004. As another example, two or more of the client device 1006, the transportation matching system 1002, and the vehicle subsystem 1008 may be physically or logically co-located with each other in whole or in part. Moreover, although FIG. 10 illustrates a particular number of the client devices 1006, the transportation matching systems 1002, the vehicle subsystems 1008, and the networks 1004, this disclosure contemplates any suitable number of the client devices 1006, the transportation matching systems 1002, the vehicle subsystems 1008, and the networks 1004. As an example, and not by way of limitation, the network environment 1000 may include multiple client devices 1006, the transportation matching systems 1002, the vehicle subsystems 1008, and the networks 1004.

This disclosure contemplates any suitable network 1004. As an example, and not by way of limitation, one or more portions of the network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1004 may include one or more networks 1004.

Links may connect the client device 1006, the transportation matching system 1002, and the vehicle subsystem 1008 to the communication network 1004 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 10. A client device 1006 may enable a network user at the client device 1006 to access a network. A client device 1006 may enable its user to communicate with other users at other client devices 1006.

In particular embodiments, the client device 1006 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1002 may be a network-addressable computing system that can host a ride share transportation network. The transportation matching system 1002 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 1002. In addition, the transportation service system may manage identities of service requestors such as users/requesters. In particular, the transportation service system may maintain requester data such as driving/riding histories, personal data, or other user data in addition to navigation and/or traffic management services or other location services (e.g., GPS services).

In particular embodiments, the transportation matching system 1002 may manage ride matching services to connect a user/requester with a vehicle and/or provider. By managing the ride matching services, the transportation matching system 1002 can manage the distribution and allocation of vehicle subsystem resources and user resources such as GPS location and availability indicators, as described herein.

The transportation matching system 1002 may be accessed by the other components of the network environment 1000 either directly or via network 1004. In particular embodiments, the transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a transportation matching system 1002 to manage, retrieve, modify, add, or delete, the information stored in data store.

In particular embodiments, the transportation matching system 1002 may provide users with the ability to take actions on various types of items or objects, supported by the transportation matching system 1002. As an example, and not by way of limitation, the items and objects may include ride share networks to which users of the transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1002 or by an external system of a third-party system, which is separate from the transportation matching system 1002 and coupled to the transportation matching system 1002 via a network 1004.

In particular embodiments, the transportation matching system 1002 may be capable of linking a variety of entities. As an example, and not by way of limitation, the transportation matching system 1002 may enable users to interact with each other or other entities, or to allow users to interact with these entities through an application programming interfaces (API) or other communication channels.

In particular embodiments, the transportation matching system 1002 may include a variety of servers, sub-systems, programs, modules, logs, and data stores. In particular embodiments, the transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1002 may also include suitable components such as network interfaces, security mechanisms, load balancers, failover servers, management-and-network-operations consoles, other suitable components, or any suitable combination thereof. In particular embodiments, the transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1002 and one or more client devices 1006. An action logger may be used to receive communications from a web server about a user's actions on or off the transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from the client device 1006 responsive to a request received from the client device 1006. Authorization servers may be used to enforce one or more privacy settings of the users of the transportation matching system 1002. A privacy setting of a user determines how particular information associated with a user can be shared. The authorization server may allow users to opt in to or opt out of having their actions logged by the transportation matching system 1002 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
one or more memory devices; and
one or more computing devices configured to:
identify a vehicle associated with a dynamic transportation matching system, wherein a service is associated with the vehicle;
identify a virtual queue of one or more other vehicles scheduled for service at a vehicle service center comprising a set of sequential stations, wherein vehicles progress through the set of sequential stations;
determine, for the virtual queue, a predefined progression rate defining a per-station maximum amount of time to perform a station service;
determine a complexity of the service associated with the vehicle, wherein the complexity of the service is based on at least one of a difficulty level, a skill level, or a number of tasks required to satisfy the service;
determine a complexity of each of one or more services associated with the one or more other vehicles, wherein the complexity of each of the one or more services is based on at least one of a difficulty level, a skill level, or a number of tasks required to satisfy each of the one or more services;
determine that, in adding the vehicle to the virtual queue, the vehicle and the one or more other vehicles corresponding to the virtual queue can proceed through the set of sequential stations of the vehicle service center in accordance with the predefined progression rate by:
based on the complexity of the service for the vehicle and the complexity of each of the one or more services for the one or more other vehicles, determining a predicted progression rate at which the vehicle and the one or more other vehicles will move through the set of sequential stations; and
comparing the predicted progression rate to the predefined progression rate to determine that adding the vehicle to the virtual queue will allow the vehicle and the one or more other vehicles to move through the set of sequential stations in accordance with the predefined progression rate;
automatically add the vehicle to the virtual queue with the one or more other vehicles scheduled for service at the vehicle service center in response to determining that the vehicle and the one or more other vehicles corresponding to the virtual queue can proceed through the set of sequential stations of the vehicle service center in accordance with the predefined progression rate; and
dispatch the vehicle to the vehicle service center in accordance with a position of the vehicle in the virtual queue.

2. The system of claim 1, wherein the one or more computing devices are further configured to:
provide, for display on a client device, a management user interface for managing the virtual queue for the vehicle service center;
detect, based on one or more interactions with the management user interface, one or more changes to the virtual queue, the one or more changes comprising an adjusted position of a second vehicle in the virtual queue; and
dispatch the second vehicle to the vehicle service center in accordance with the adjusted position of the second vehicle in the virtual queue.

3. The system of claim 1, wherein the one or more computing devices are further configured to:
- identify a second vehicle with a service;
- determine that, in adding the second vehicle to the virtual queue, the second vehicle and the one or more other vehicles corresponding to the virtual queue cannot move through the set of sequential stations in accordance with the predefined progression rate; and
- refrain from adding the second vehicle to the virtual queue.

4. The system of claim 1, wherein the one or more computing devices are further configured to:
- identify an open position in the virtual queue;
- identify the one or more other vehicles from one or more positions adjacent the open position in the virtual queue; and
- add the vehicle to the open position in response to determining that adding the vehicle to the open position in the virtual queue will allow the vehicle and the one or more other vehicles to move through the set of sequential stations in accordance with the predefined progression rate.

5. The system of claim 1, wherein the one or more computing devices are further configured to determine the predicted progression rate at which the vehicle and the one or more other vehicles will move through the set of sequential stations by:
- determining an ordering of the vehicle and the one or more other vehicles in positions of the virtual queue by provisionally adding the vehicle to an open position of the virtual queue; and
- determining the predicted progression rate for the ordering of the vehicle and the one or more other vehicles with the vehicle in the open position of the virtual queue for comparison with the predefined progression rate.

6. The system of claim 5, wherein the one or more computing devices are further configured to determine the ordering of the vehicle and the one or more other vehicles in positions of the virtual queue by provisionally adding the vehicle to the open position of the virtual queue by:
- identifying one or more open positions of the virtual queue; and
- selecting the open position from among the one or more open positions of the virtual queue by:
  - determining that the complexity of the one or more services associated with an additional vehicle from among the one or more other vehicles in a position adjacent to the open position is low or high; and
  - determining that the complexity of the service associated with the vehicle is opposite to the complexity of the one or more services associated with the additional vehicle.

7. The system of claim 1, wherein the one or more computing devices are further configured to:
- determine a first complexity associated with the service for the vehicle;
- determine a second complexity associated with a second service for a second vehicle of the one or more other vehicles in the virtual queue, wherein the second complexity is determined to be greater than the first complexity;
- determine a third complexity associated with a third service for a third vehicle of the one or more other vehicles in the virtual queue, wherein the third complexity is determined to be greater than the first complexity; and
- add the vehicle to an open position in the virtual queue between a position of the second vehicle and a position of the third vehicle based at least on the second complexity being greater than the first complexity and the third complexity being greater than the first complexity.

8. A non-transitory computer-readable storage medium comprising instructions that, when executed by at least one processor, cause a computer system to:
- identify a vehicle associated with a dynamic transportation matching system, wherein a service is associated with the vehicle;
- identify a virtual queue of one or more other vehicles scheduled for service at a vehicle service center comprising a set of sequential stations, wherein vehicles progress through the set of sequential stations;
- determine, for the virtual queue, a predefined progression rate defining a per-station maximum amount of time to perform a station service;
- determine a complexity of the service associated with the vehicle, wherein the complexity of the service is based on at least one of a difficulty level, a skill level, or a number of tasks required to satisfy the service;
- determine a complexity of each of one or more services associated with the one or more other vehicles, wherein the complexity of each of the one or more services is based on at least one of a difficulty level, a skill level, or a number of tasks required to satisfy each of the one or more services;
- determine that, in adding the vehicle to the virtual queue, the vehicle and the one or more other vehicles corresponding to the virtual queue can proceed through the set of sequential stations of the vehicle service center in accordance with the predefined progression rate by:
  - based on the complexity of the service for the vehicle and the complexity of each of the one or more services for the one or more other vehicles, determining a predicted progression rate at which the vehicle and the one or more other vehicles will move through the set of sequential stations; and
  - comparing the predicted progression rate to the predefined progression rate to determine that adding the vehicle to the virtual queue will allow the vehicle and the one or more other vehicles to move through the set of sequential stations in accordance with the predefined progression rate;
- automatically add the vehicle to the virtual queue with the one or more other vehicles scheduled for service at the vehicle service center in response to determining that the vehicle and the one or more other vehicles corresponding to the virtual queue can proceed through the set of sequential stations of the vehicle service center in accordance with the predefined progression rate; and
- dispatch the vehicle to the vehicle service center in accordance with a position of the vehicle in the virtual queue.

9. The non-transitory computer-readable storage medium of claim 8, further comprising instructions that, when executed by the at least one processor, cause the computer system to:
- provide, for display on a client device, a management user interface for managing the virtual queue for the vehicle service center;
- detect, based on one or more interactions with the management user interface, one or more changes to the virtual queue, the one or more changes comprising an adjusted position of a second vehicle in the virtual queue; and dispatch the second vehicle to the vehicle service center in accordance with the adjusted position of the second vehicle in the virtual queue.

10. The non-transitory computer-readable storage medium of claim 8, further comprising instructions that, when executed by the at least one processor, cause the computer system to:

identify a second vehicle with a service;

determine that, in adding the second vehicle to the virtual queue, the second vehicle and the one or more other vehicles corresponding to the virtual queue cannot move through the set of sequential stations in accordance with the predefined progression rate; and refrain from adding the second vehicle to the virtual queue.

11. The non-transitory computer-readable storage medium of claim 8, further comprising instructions that, when executed by the at least one processor, cause the computer system to:

identify an open position in the virtual queue;

identify the one or more other vehicles from one or more positions adjacent the open position in the virtual queue; and add the vehicle to the open position in response to determining that adding the vehicle to the open position in the virtual queue will allow the vehicle and the one or more other vehicles to move through the set of sequential stations in accordance with the predefined progression rate.

12. The non-transitory computer-readable storage medium of claim 8, further comprising instructions that, when executed by the at least one processor, cause the computer system to:

analyze information associated with the service for the vehicle and information associated with one or more services for the one or more other vehicles to determine a complexity of the service for the vehicle and a complexity of each of the one or more services for the one or more other vehicles; and based on the complexity of the service for the vehicle and the complexity for each of the one or more services for the one or more other vehicles, determine that adding the vehicle to the virtual queue will allow the vehicle and one or more other vehicles corresponding to the virtual queue to move through the set of sequential stations at a predefined progression.

13. The non-transitory computer-readable storage medium of claim 12, further comprising instructions that, when executed by the at least one processor, cause the computer system to:

based on the complexity of the service for the vehicle and the complexity of each of the one or more services for the one or more other vehicles, determine a predicted progression rate at which the vehicle and the one or more other vehicles will move through the set of sequential stations; and compare the predicted progression rate to the predefined progression rate to determine that adding the vehicle to the virtual queue will allow the vehicle and the one or more other vehicles to move through the set of sequential stations in accordance with the predefined progression rate.

14. The non-transitory computer-readable storage medium of claim 8, further comprising instructions that, when executed by the at least one processor, cause the computer system to:

determine a first complexity associated with the service for the vehicle;

determine a second complexity associated with a second service for a second vehicle of the one or more other vehicles in the virtual queue, wherein the second complexity is determined to be greater than the first complexity;

determine a third complexity associated with a third service for a third vehicle of the one or more other vehicles in the virtual queue, wherein the third complexity is determined to be greater than the first complexity; and add the vehicle to an open position in the virtual queue between a position of the second vehicle and a position of the third vehicle based at least on the second complexity being greater than the first complexity and the third complexity being greater than the first complexity.

15. A computer-implemented method comprising:

identifying a vehicle associated with a dynamic transportation matching system, wherein a service is associated with the vehicle;

identifying a virtual queue of one or more other vehicles scheduled for service at a vehicle service center comprising a set of sequential stations, wherein vehicles progress through the set of sequential stations;

determining, for the virtual queue, a predefined progression rate defining a per-station maximum amount of time to perform a station service;

determining a complexity of the service associated with the vehicle, wherein the complexity of the service is based on at least one of a difficulty level, a skill level, or a number of tasks required to satisfy the service;

determining a complexity of each of one or more services associated with the one or more other vehicles, wherein the complexity of each of the one or more services is based on at least one of a difficulty level, a skill level, or a number of tasks required to satisfy each of the one or more services;

determining that, in adding the vehicle to the virtual queue, the vehicle and the one or more other vehicles corresponding to the virtual queue can proceed through the set of sequential stations of the vehicle service center in accordance with the predefined progression rate by based on the complexity of the service for the vehicle and the complexity of each of the one or more services for the one or more other vehicles, determining a predicted progression rate at which the vehicle and the one or more other vehicles will move through the set of sequential stations; and comparing the predicted progression rate to the predefined progression rate to determine that adding the vehicle to the virtual queue will allow the vehicle and the one or more other vehicles to move through the set of sequential stations in accordance with the predefined progression rate;

automatically adding the vehicle to the virtual queue with the one or more other vehicles scheduled for service at the vehicle service center in response to determining that the vehicle and the one or more other vehicles corresponding to the virtual queue can proceed through the set of sequential stations of the vehicle service center in accordance with the predefined progression rate; and dispatching the vehicle to the vehicle service center in accordance with a position of the vehicle in the virtual queue.

16. The computer-implemented method of claim 15, further comprising:

providing, for display on a client device, a management user interface for managing the virtual queue for the vehicle service center;

detecting, based on one or more interactions with the management user interface, one or more changes to the virtual queue, the one or more changes comprising an adjusted position of a second vehicle in the virtual queue; and dispatching the second vehicle to the vehicle service center in accordance with the adjusted position of the second vehicle in the virtual queue.

17. The computer-implemented method of claim 15, further comprising:

identifying a second vehicle with a service;

determining that, in adding the second vehicle to the virtual queue, the second vehicle and the one or more other vehicles corresponding to the virtual queue cannot move through the set of sequential stations in accordance with the predefined progression rate; and refraining from adding the second vehicle to the virtual queue.

18. The computer-implemented method of claim 15, further comprising:

identifying an open position in the virtual queue;

identifying the one or more other vehicles from one or more positions adjacent the open position in the virtual queue; and adding the vehicle to the open position in response to determining that adding the vehicle to the open position in the virtual queue will allow the vehicle and the one or more other vehicles to move through the set of sequential stations in accordance with the predefined progression rate.

19. The computer-implemented method of claim 15, further comprising:

analyzing information associated with the service for the vehicle and information associated with one or more services for the one or more other vehicles to determine a complexity of the service for the vehicle and a complexity of each of the one or more services for the one or more other vehicles; and based on the complexity of the service for the vehicle and the complexity for each of the one or more services for the one or more other vehicles, determining that adding the vehicle to the virtual queue will allow the vehicle and one or more other vehicles corresponding to the virtual queue to move through the set of sequential stations at a predefined progression.

20. The computer-implemented method of claim 19, further comprising:

based on the complexity of the service for the vehicle and the complexity of each of the one or more services for the one or more other vehicles, determining a predicted progression rate at which the vehicle and the one or more other vehicles will move through the set of sequential stations; and comparing the predicted progression rate to the predefined progression rate to determine that adding the vehicle to the virtual queue will allow the vehicle and the one or more other vehicles to move through the set of sequential stations in accordance with the predefined progression rate.

* * * * *